(12) United States Patent
Parthasarathy et al.

(10) Patent No.: US 9,293,912 B2
(45) Date of Patent: Mar. 22, 2016

(54) HIGH VOLTAGE TOLERANT SUPPLY CLAMP

(71) Applicant: ANALOG DEVICES, INC., Norwood, MA (US)

(72) Inventors: Srivatsan Parthasarathy, Acton, MA (US); Javier Alejandro Salcedo, North Billerica, MA (US)

(73) Assignee: Analog Devices, Inc., Norwood, MA (US)

( * ) Notice: Subject to any disclaimer, the term of this patent is extended or adjusted under 35 U.S.C. 154(b) by 262 days.

(21) Appl. No.: 14/024,426

(22) Filed: Sep. 11, 2013

(65) Prior Publication Data

US 2015/0070806 A1    Mar. 12, 2015

(51) Int. Cl.
*H02H 9/00* (2006.01)
*H02H 9/04* (2006.01)

(52) U.S. Cl.
CPC ...................... *H02H 9/04* (2013.01)

(58) Field of Classification Search
CPC .................... H02H 9/04; H02H 9/041
USPC .......................... 361/56, 91.1, 111
See application file for complete search history.

(56) References Cited

U.S. PATENT DOCUMENTS

| | | | |
|---|---|---|---|
| 5,719,733 A | 2/1998 | Wei et al. | |
| 5,748,425 A | 5/1998 | Gutsch et al. | |
| 5,835,328 A | 11/1998 | Maloney et al. | |
| 5,870,268 A * | 2/1999 | Lin et al. | 361/111 |
| 6,249,410 B1 * | 6/2001 | Ker et al. | 361/56 |
| 6,429,489 B1 | 8/2002 | Botula et al. | |
| 6,442,008 B1 | 8/2002 | Anderson | |
| 6,614,633 B1 | 9/2003 | Kohno | |
| 7,064,393 B2 | 6/2006 | Mergens et al. | |
| 7,102,862 B1 | 9/2006 | Lien et al. | |
| 7,221,551 B2 * | 5/2007 | Chen | 361/230 |
| 7,397,642 B2 * | 7/2008 | Ker et al. | 361/56 |
| 7,706,113 B1 | 4/2010 | Lien et al. | |

(Continued)

FOREIGN PATENT DOCUMENTS

| | | |
|---|---|---|
| EP | 1617477 A1 | 1/2006 |
| EP | 1048078 B1 | 5/2010 |
| WO | WO 2009/050641 | 4/2009 |

OTHER PUBLICATIONS

Salcedo et al., Electrostatic Discharge Protection Framework for Mixed-Signal High Voltage CMOS Applications. 9th International Conference on Solid-State and Integrated-Circuit Technology, Oct. 2008. 4 pages.

*Primary Examiner* — Stephen W Jackson
*Assistant Examiner* — Christopher Clark
(74) *Attorney, Agent, or Firm* — Knobbe Martens Olson & Bear LLP

(57) ABSTRACT

Apparatus and methods for active detection, timing, and protection related to transient electrical events are disclosed. A detection circuit generates a detection signal in response to a transient electrical stress. First and second driver circuits of an integrated circuit, each driver having one or more bipolar junction transistors, activate based on the detection signal and generate activation signals. The one or more bipolar junction transistors of the first and second driver circuits are configured to conduct current substantially laterally across respective base regions. A discharge circuit, having an upper discharge element and a lower discharge element, receives the activation signals and activates to attenuate the transient electrical event.

18 Claims, 12 Drawing Sheets

(56) References Cited

U.S. PATENT DOCUMENTS

| | | | |
|---|---|---|---|
| 7,738,222 B2 | 6/2010 | Deutschmann et al. | |
| 8,320,091 B2 | 11/2012 | Salcedo et al. | |
| 8,363,368 B2* | 1/2013 | Poulton | 361/56 |
| 8,422,187 B2 | 4/2013 | Parthasarathy et al. | |
| 8,582,261 B2 | 11/2013 | Salcedo et al. | |
| 8,730,630 B2 | 5/2014 | Parthasarathy et al. | |
| 8,767,359 B2* | 7/2014 | Zhu et al. | 361/56 |
| 2002/0153571 A1 | 10/2002 | Mergens et al. | |
| 2004/0114288 A1 | 6/2004 | Cheng, et al. | |
| 2005/0275989 A1* | 12/2005 | Chen | 361/93.1 |
| 2006/0103998 A1 | 5/2006 | Smith | |
| 2007/0076338 A1 | 4/2007 | Traynor et al. | |
| 2008/0247102 A1* | 10/2008 | Vinson | 361/56 |
| 2008/0304191 A1 | 12/2008 | Riviere et al. | |
| 2008/0316659 A1 | 12/2008 | Oguzman et al. | |
| 2010/0214706 A1 | 8/2010 | Crespo et al. | |
| 2011/0235228 A1 | 9/2011 | Salcedo et al. | |
| 2012/0002337 A1 | 1/2012 | Parthasarathy et al. | |
| 2012/0057260 A1* | 3/2012 | Poulton | 361/56 |
| 2013/0155558 A1* | 6/2013 | Bourgeat et al. | 361/56 |
| 2013/0194005 A1* | 8/2013 | Voutilainen et al. | 327/108 |
| 2013/0265676 A1* | 10/2013 | Prabhu et al. | 361/56 |
| 2014/0133055 A1 | 5/2014 | Parthasarathy et al. | |
| 2014/0154845 A1* | 6/2014 | Cai et al. | 438/128 |
| 2014/0286085 A1* | 9/2014 | Miyakawa | 365/158 |

* cited by examiner

HIGH VOLTAGE TOLERANT SUPPLY CLAMP

BACKGROUND

1. Field

Embodiments of the invention relate to electronic systems, and more particularly, to transient electrical event protection circuits.

2. Description of the Related Technology

Certain electronic systems can be exposed to a transient electrical event, or an electrical signal of short duration having rapidly changing voltage and high power. Transient electrical events can include, for example, electro static discharge (ESD) events arising from the abrupt release of charge from an object or person to an electronic system.

Transient electrical events can destroy integrated circuits (ICs) due to overvoltage conditions and high levels of power dissipation in relatively small areas of the ICs. Transient electrical events can increase integrated circuit (IC) temperature, and can lead to numerous problems, such as gate oxide punch-through, junction damage, metal damage, and surface charge accumulation. Transient electrical events can be a problem in a variety of applications, including, for example, in high performance radio frequency (RF) circuit applications. Thus, there is a need for providing protection over ICs in an electronic system from such transient electrical events.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section titled "Detailed Description," one will understand how the features of this invention provide advantages that include improving protection of integrated circuits against transient electrical events, such as, but is not limited to, electrostatic discharges.

In one embodiment, an apparatus is disclosed. The apparatus comprises a detection circuit configured to generate a detection signal based at least on a transient electrical stress event at a first node. The apparatus further comprises first and second driver circuits of an integrated circuit. The first and second driver circuits are configure to receive the detection signal. Each of the first and second driver circuits comprises one or more bipolar junction transistors configured to activate based at least on the detection signal. The first and second driver circuits are configured to generate activation signals at least while the one or more bipolar junction transistors of the respective driver circuits are activated. The one or more bipolar junction transistors of the first and second driver circuits are configured to conduct current substantially laterally across respective base regions. The apparatus further comprises a discharge circuit configured to receive the activation signals of the first and second driver circuits. The discharge circuit comprises a first field effect transistor configured to activate based at least on the activation signal of the first driver circuit. The discharge circuit further comprises a second field effect transistor arranged in series with the first field effect transistor. The second field effect transistor is configured to activate based at least on the activation signal of the second driver circuit. When activated in an ON state, the first field effect transistor and the second field effect transistor are configured to conduct a current of the transient electrical stress event between the first node and a second node.

In another embodiment, an electronically-implemented method of providing transient electrical protection is disclosed. The method comprises generating a detection signal in response to a transient electrical stress event at a first node. The method further comprises generating first and second activation signals with first and second driver circuits, respectively, based at least on the detection signal, each of the first and second driver circuits of an integrated circuit comprising one or more bipolar junction transistors configured to activate based at least on the detection signal, wherein the first and second driver circuits are configured to generate the first activation signal and the second activation signal, respectively, at least while the one or more bipolar junction transistors of the corresponding driver circuit are activated in an ON state, wherein the one or more bipolar junction transistors of the first and second driver circuits are configured to conduct current substantially laterally across respective base regions. The method further comprises discharging the transient electrical stress event. The discharging comprises activating a first field effect transistor based at least on the first activation signal, and activating a second field effect transistor based at least on the second activation signal. The first and second field effect transistors are arranged in series. The discharging further comprises conducting a current of the transient electrical stress event across a discharge path interconnecting the first node and a second node based at least on the activation of the first and second field effect transistors.

In another embodiment, an apparatus of providing transient electrical protection is disclosed. The apparatus comprises a means for generating a detection signal in response to a transient electrical stress event at a first node. The apparatus further comprises an integrated circuit. The integrated circuit comprises a means for generating a first activation signal based at least on the detection signal. The first activation signal generating means comprises one or more bipolar junction transistors configured to activate based at least on the detection signal. The first activation signal generating means is configured to generate the first activation signal at least while the one or more bipolar junction transistors of the first activation signal generating means are activated in an ON state. The one or more bipolar junction transistors of the first activation signal generating means are configured to conduct current substantially laterally across respective base regions. The integrated circuit further comprises a means for generating a second activation signal based at least on the detection signal. The second activation signal generating means comprising one or more bipolar junction transistors configured to activate based at least on the detection signal. The second activation signal generating means is configured to generate the second activation signal at least while the one or more bipolar junction transistors of the second activation signal generating means are activated. The one or more bipolar junction transistors of the second activation signal generating means are configured to conduct current substantially laterally across respective base regions. The integrated circuit further comprises a means for discharging the transient electrical stress event, for activating a first field effect transistor based at least on the first activation signal, for activating a second field effect transistor arranged in series with the first field effect transistor based at least on the second activation signal, and for carrying a current of the transient electrical stress event across a discharge path, interconnecting the first node and a second node, based at least on the activation of the first and second field effect transistors.

BRIEF DESCRIPTION OF THE DRAWINGS

These drawings (not to scale) and the associated description herein are provided to illustrate specific embodiments of the invention and are not intended to be limiting.

DETAILED DESCRIPTION OF EMBODIMENTS

Figure 1:
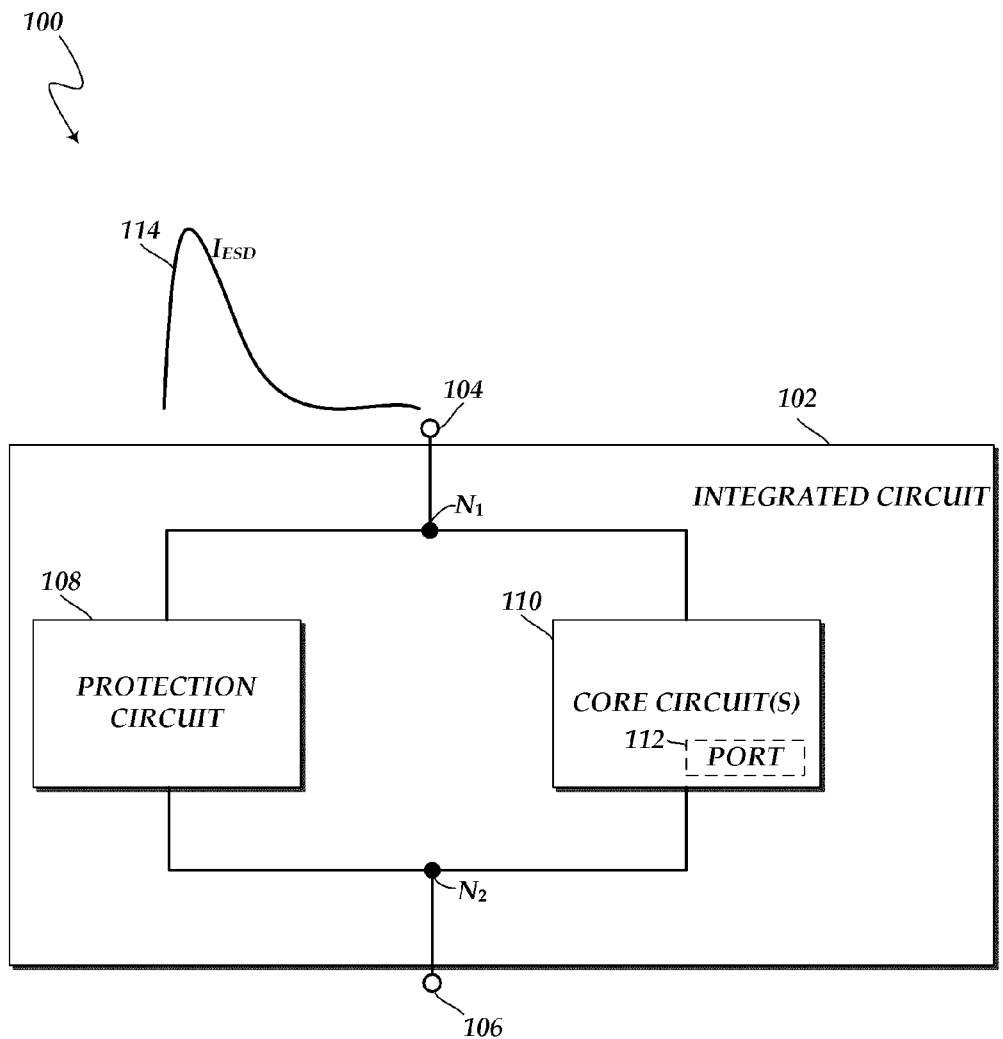
FIG. 1 is a schematic block diagram of an electronic system, which can include one or more electronic protection circuits according to some embodiments.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Transient electrical stress events ("transient electrical events")—including transient overvoltage, overcurrent, ESD, and the like events—can damage or disrupt electronic devices. For example, an IC can include one or more pads, pins, ports, and like electrical connections (collectively referred herein as "pins") that can provide electrical connections between internal core circuits of the IC and/or to external circuits or devices (for example, a printed circuit board, a power supply, and voltage references). Accordingly, these connections can be exposed to transient electrical events and provide an electrical pathway for the transient electrical pathways within the IC. As one result, the IC and/or core circuits can be vulnerable to transient electrical events.

The reliability of such core circuits can be improved by providing pad protection circuits to the pads of an IC. Such a pad protection circuit can also be generally referred to as an "electronic protection circuit" (or simply "protection circuit" or "clamp") in this document. The pad protection circuits can maintain one or more pads at a voltage level within a predefined safe range. For example, the pad protection circuit can be configured to transition from a relatively high-impedance state providing relatively low leakage currents to a relatively low-impedance state when a transient electrical event is detected. In operation, the pad protection circuit can be configured to switch to the low-impedance state for a duration of time in response to detecting a transient electrical event. The pad protection circuit should remain in the low-impedance state at least during a period of time referred to as the "stress time"—for example, the time in which an electrical stress event can be disruptive or harmful to the core circuits.

Some electronic devices, such as mobile applications, now include back-compatible interfaces that utilize power domains operating at 5 V. Additionally or alternatively, some electronic devices are now formed with, for example, sub-65 nm complementary metal oxide semiconductor (CMOS) integrated circuits having core circuits operating with 3.3 Volts (V) overdrive characteristic. Such electronic devices may provide high-performance data communications, such as High Definition Multimedia Interface (HDMI) 2.0 (for example, providing data transfer rates of about 6 gigabits per second (GBPS)) and/or Mobile High-Definition Link (MHL). In one aspect, these interfaces can provide, for example, high-definition (HD) media, such video, audio, or data, while optionally charging a connected device simultaneously. In operation, these connections, as stated, can be exposed to or create transient electrical events, which can negatively affect the reliability and robustness of the IC and its core circuit.

Some electronic protection circuits are configured to activate at a transient voltage above the circuit operating voltage, but below the breakdown of the sensitive core circuits or devices in the process. This protection mechanism is not suitable for some ICs. For example, ICs providing high-performance mixed-signal functionality may operate the core circuits close to or at the breakdown voltage (for example, $BV_{CEO}$) of their transistors. In such a scenario, electronic protection circuits using junction-breakdown triggered devices can be configured to trigger at a voltage that is about 10% to about 20% higher than the supply voltage to avoid triggering during normal operation. But by relying on the direct junction breakdown, protection may be triggered post-breakdown of the core circuit, undermining the utility of the electronic protection circuit and leading to failures. Such failures may affect product release, delay time to market, or lead to products released with a lower than target ESD rating.

There is therefore a need for a protection circuit for sub-65 nm ICs process and/or ICs operating in about the 3.3 V and/or 5 V power domains. There is also a need for a protection circuit that can detect transient electrical events without relying on direct junction breakdown to provide voltage clamping. Furthermore, there is a need for improved actively-controlled protection circuits which can be configured to provide transient electrical event protection under a wide-range of conditions (such as direct current (DC) operating points, temperatures, device/process variations, and the like operating characteristics) in a controlled and lasting manner and which have enhanced stability and robustness against false activation. Moreover, there is a need for a protection circuit having a relatively fast activation time, relatively low static power dissipation, and a relatively small area for low cost in, for example, high-speed communication and power applications.

Aspects of embodiments described herein relate to protection circuits for protecting a core circuit against transient electrical events. In one aspect, a driver stage is cascaded with a discharge stage for protecting a core circuit against transient electrical events. For example, the driver stage can include a first bipolar junction transistor (BJT) driver for controlling a first MOSFET of the discharge stage. Additionally, the driver stage can include a second BJT driver for controlling a second MOSFET of the discharge stage. In operation, the driver stage can receive a detection signal indicative of a transient electrical event, amplify the current of the detection signal, and generate activation signals to activate the discharge stage into a low-impedance state.

In one aspect of an embodiment, cascading the driver stage and the discharge stage can mitigate some limitations of BJT devices that are available in CMOS technologies. For example, in a specific embodiment, the driver stage and the discharge stage can be implemented with CMOS process, such as a sub-65 nm CMOS. For example, the BJT devices of the driver stage can be formed using the feature definitions of a sub-65 nm CMOS process. The BJT devices can be arranged in a folded Darlington architecture to provide current amplification (for example, $\beta$ multiplication). Combining the Darlington architecture with the discharge stage can be effective for activating the discharge stage upon stress.

In a specific embodiment, the protection circuit includes a biasing or overvoltage protection circuit for providing a reference voltage to a node of the discharge circuit. The reference voltage can be effective for regulating a voltage of a node of the discharge stage and preventing the one or more MOSFET devices from entering an overvoltage condition during normal operation. In another specific example, the protection circuit includes a voltage reference circuit to provide a reference voltage at a gate of the discharge stage when the driver stage is activated. The reference voltage can aid in extending the duration that the driver stage remains activated and protects the core circuits against long-duration over-stress conditions.

Electronic Systems Susceptible to Transient Electrical Events

FIG. 1 is a schematic block diagram of an electronic system 100, which can include one or more pad or electronic protection circuits according to some embodiments. The illustrated electronic system 100 includes an IC 102 that includes pins or pads 104, 106, a protection circuit 108, and a core circuit 110. The core circuit 110 can include port 112. The IC 102 also includes a first node $N_1$ and a second node $N_2$, which can be operatively coupled to one or more of the pads 104, 106, the protection circuit 108, the core circuit 110, or additional blocks not shown. Although the pads 104, 106, the protection circuit 108, and the core circuit 110 are shown as each being coupled to at least one of the first or second nodes $N_1$, $N_2$, in certain embodiments, not all of the illustrated connections are necessary.

Figure 6:
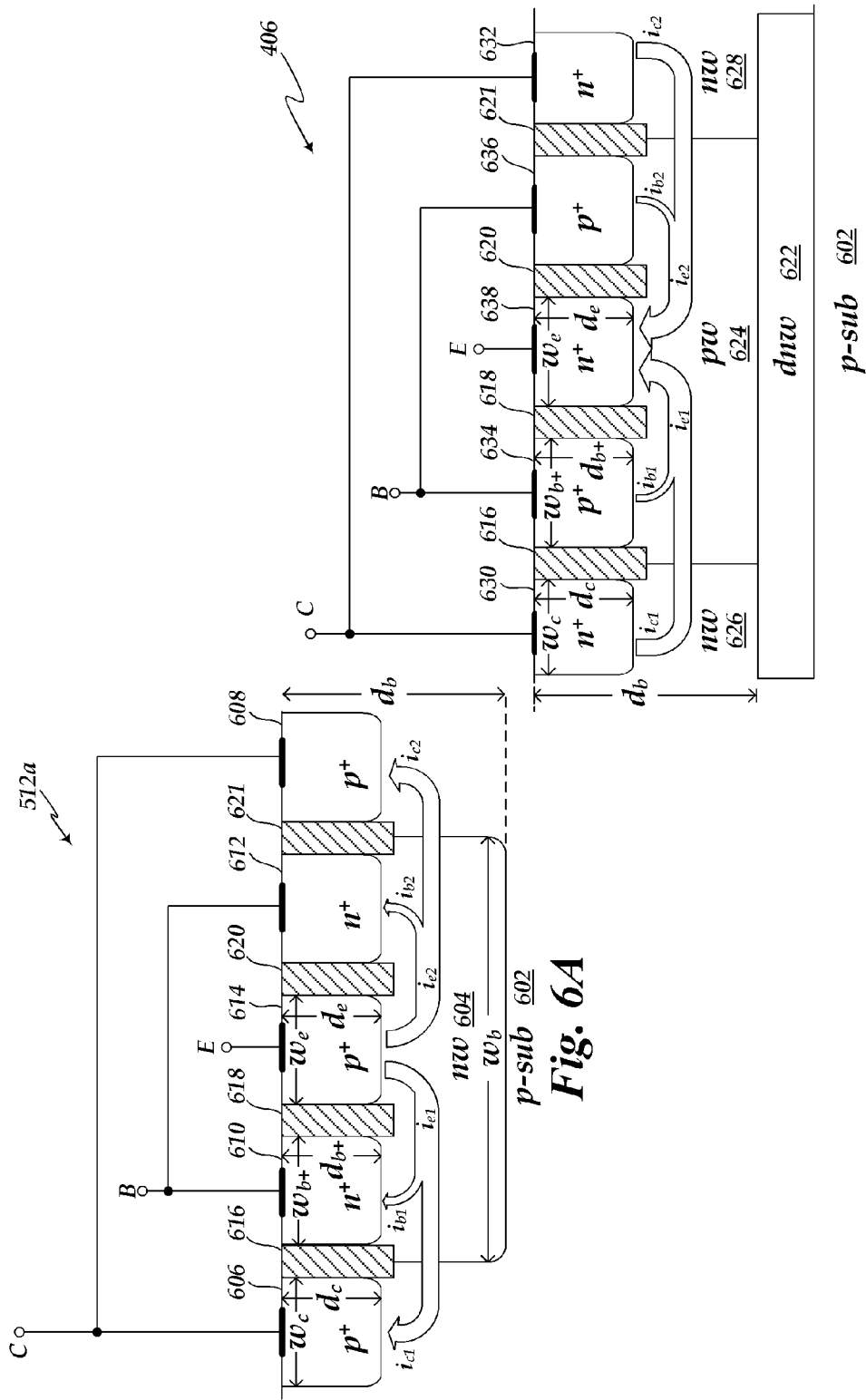
FIGS. 6A and 6B are schematic diagrams illustrating cross sections of embodiments of bipolar junction transistors that can be included in the upper and lower driver circuits of FIG. 2.

In one embodiment, the IC 102 can correspond to an integrated circuit manufactured by a CMOS process. For example, the IC can be fabricated in a full CMOS process (in contrast, for example, to a BiCMOS process). As described in greater detail later in connection with FIGS. 6A and 6B, some BJT devices of the electronic protection circuit 108 can be formed using CMOS process definitions.

The pads 104, 106 of the IC 102 can be coupled to the core circuit 110 and can, for example, be used for data communication, control signaling, power supply, biasing, configuration, and/or the like. Additionally, each of the pads 104, 106 can be, for example, a power pad, a ground pad, a unidirectional pad, and/or a bidirectional pad. For example, the pad 104 can be coupled to a supply voltage and the pad 106 can be coupled to ground, thereby providing power to circuits coupled across the first and second nodes $N_1$, $N_2$.

The core circuit 110, being operatively coupled to the first and second nodes $N_1$, $N_2$, can include one or more circuits of various functionalities. As a few non-limiting examples, among others, the core circuit 110 can be related to operating or supporting data communication (for example, HDMI 2.0 and/or MHL) while separately or simultaneously charging or powering a connected device, in mobile and consumer electronics.

The core circuit 110 can be exposed to a transient electrical event 114, such as ESD events, which can induce latch-up or cause damage. For example, the pad 104 of the IC 102 can receive the transient electrical event 114, which can travel along electrical connections of the IC 102 and reach the core circuit 110 via the first node $N_1$. Without a sufficient protection mechanism, the transient electrical event 114 can produce an overvoltage condition and cause the core circuit 110 to dissipate high levels of power, which can disrupt the functioning of, and potentially cause permanent damage to, the core circuit 110.

There are various models of transient electrical events 114. For example, the transient electrical event 114 can be an ESD event having a duration varying between 0.01 and 0.7 microseconds ($\mu$s) for the ESD HBM (Human Body Model) and CDM (Charged Device Model) ESD classification tests, respectively. These ESD events can be characterized by current rise times ranging from 0.2 to 10 nanoseconds (ns). It will be appreciated by one skilled in the art that not all of the above-listed electrical characteristics are required and the transient electrical events can be caused by non-human sources.

To ensure reliability and safety of the core circuit 110, the electronic protection circuit 108 can be included in the IC 102. The electronic protection circuit 108 can be configured to detect the transient electrical event 114 received at a pad of the IC 102, and to shunt a current associated with the transient electrical event 114 to other nodes or pads of the IC 102 during the course of the transient electrical event 114, thereby protecting the core circuit 110, as will be described in further detail below.

The electronic protection circuit 108 can be placed between a power pad and a ground pad, for example, connected to the port 112. Additionally, in certain embodiments, the electronic protection circuit 108 can be placed in other configurations, including, for example, between a power pad and a second power pad, between a power pad and an input pad, between a power pad and an output pad, between a power pad and a bidirectional pad, between a ground pad and an input pad, between a ground pad and an output pad, between a ground pad and a bidirectional pad, between an input pad and a second input pad, between an input pad and an output pad, between an input pad and a bidirectional pad, between an output pad and a second output pad, between an input pad and a bidirectional pad, and/or between a bidirectional pad and a second bidirectional pad. When no transient electrical event is present, the electronic protection circuit can remain in a high-impedance/low-leakage state, thereby reducing static power dissipation resulting from leakage current to an acceptable level.

The electronic protection circuit 108 can be integrated on-chip with the IC 102. However, in other embodiments, the electronic protection circuit 108 can be arranged in a separate IC. For example, the electronic protection circuit 108 can be included in a separately packaged IC, or the electronic protection circuit 108 can be included or encapsulated in a common package with the IC 102. In such embodiments, one or more electronic protection circuits can be placed in a stand-alone IC, in a common package for system-on-a-package applications, or integrated with an IC in a common semiconductor substrate for system-on-a-chip applications.

The IC 102 can be used in, for example, consumer electronics, mobile devices, multimedia devices, ultra high definition applications, high speed radio frequency (RF) devices, medical devices, transmission line devices, industrial control devices, power management devices, microelectromechanical system (MEMS) sensors, amplifiers, transducers, or a variety of other systems and applications. The IC 102 can be utilized in electronic systems in which the pins of the IC are exposed, for example, to conditions that generate field-induced discharges, mechanical conductive tools for handling and testing, and/or direct user contact through a low-impedance connection, during manufacturing, storage, intended use, and/or unintended use.

Illustrative Electronic Protection Circuits

Figure 2:
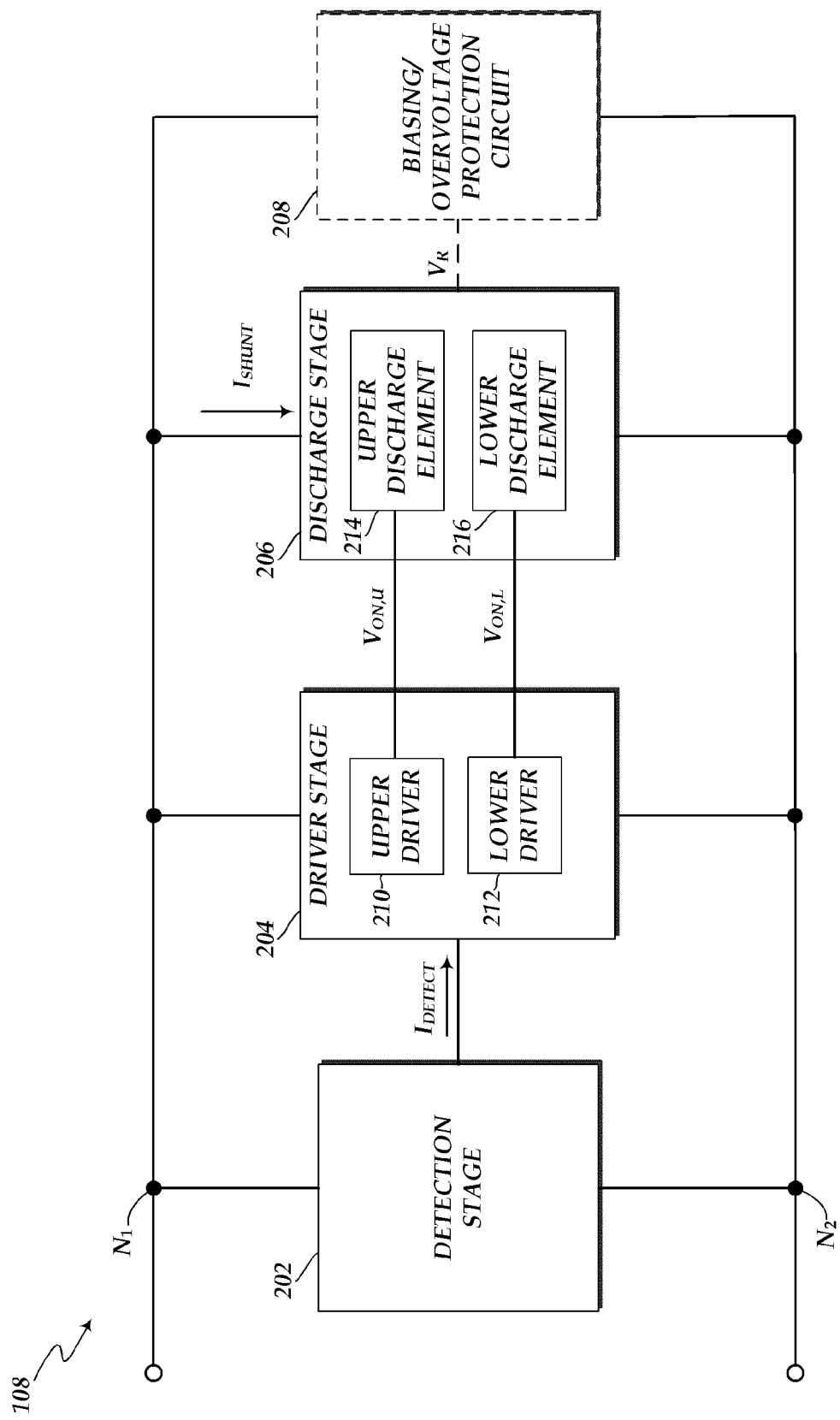
FIG. 2 is a schematic block diagram illustrating one embodiment of an electronic protection circuit of FIG. 1.

FIG. 2 is a schematic block diagram illustrating one embodiment of an electronic protection circuit 108 of FIG. 1. FIGS. 3-7 are schematic diagrams illustrating example embodiments of elements of the FIG. 2. Elements common to the various figures share common reference indicia, and only differences between the Figures are described herein for the sake of brevity.

The illustrated protection circuit 108 includes a detection stage 202, a driver stage 204, a discharge stage 206, and a biasing or overvoltage protection circuit 208 ("overvoltage protection circuit"), each operatively coupled to the first node $N_1$ and the second node $N_2$. The illustrated driver stage 204 includes an upper driver 210 and a lower driver 212. The discharge stage 206 includes an upper discharge element 214 and a lower discharge element 216. Although the detection stage 202, the driver stage 204, the discharge stage 206, and the optional overvoltage protection circuit 208 are shown as each being coupled to at least one of the first or second nodes $N_1$, $N_2$, in certain embodiments, not all of the illustrated connections are necessary. Furthermore, in some embodiments of the protection circuit 108, the biasing or overvoltage protection circuit 208 can be omitted.

As will be described in detail below, the protection circuit 108 can be configured to operate in a low-leakage/high-impedance state (or "OFF state") for normal operating conditions, and in a low-impedance state (or "ON state") in the presence of a transient electrical event. Upon detection of a transient electrical event, the detection stage 202 activates and generates a detection signal $I_{DETECT}$ for some duration of time. In response to the detection signal $I_{DETECT}$, the driver stage 204 activates and generates a first and second activation current $I_{ON,U}$, $I_{ON,L}$ to activate the discharge stage 206 for dissipation of the transient electrical event. In response to the second activation current $I_{ON}$, the discharge stage 206 activates and operates in the ON state, thereby shunting a current $I_{SHUNT}$, for example, away from the core circuit 110 of FIG. 1. Moreover, to inhibit the discharge stage 206 from experiencing an overvoltage condition and switching to the ON state during normal operation, the overvoltage protection circuit 208 can bias the discharge stage 206.

The detection stage 202 can include circuitry configured to detect a transient electrical event on the first node $N_1$ and/or second node $N_2$, and to generate a detection signal $I_{DETECT}$ indicative of whether or not a transient electrical event has been detected. For example, the illustrated detection stage 202 is operatively coupled to the first node N1 and operatively coupled to the second node. The detection stage 202 senses changes in electrical characteristics presented at the first node and the second node. Based at least on the sensing, the detection stage 202 is configured to generate the detection signal $I_{DETECT}$.

Detected transient electrical events can be based on, but are not limited to, the following: observations of power, energy, voltage, charge, and rates of change thereof. For example, the detection stage 202 can be configured to generate the detection signal $I_{DETECT}$ when the detection stage 202 detects a rapidly changing voltage for a sufficient period of time on the first node $N_1$ and/or second node $N_2$, such as transient electrical signals having a rate of current change in the range of about 10 mA/ns to about 1 A/ns for a length of time in the range of about 2 ns to about 500 ns. In some embodiments, the detection stage 202 is configured to remain deactivated for normal variations in the voltages of the first node $N_1$ and the second node $N_2$, including, for example, transients associated with inserting an IC into a live socket or connecting an HDMI link. One embodiment of the detection stage 202 will be described below with reference to FIG. 3.

The illustrated driver stage 204 can include circuitry configured to receive the detection signal $I_{DETECT}$ and to generate the first and second activation signals $V_{ON,U}$, $V_{ON,L}$. For example, the illustrated driver stage 204 is configured to buffer and/or amplify the detection signal $I_{DETECT}$, received from the detection stage 202, to generate the first and second activation signals $V_{ON,U}$, $V_{ON,L}$. The first and second activation signals $V_{ON,U}$, $V_{ON,L}$ can activate and/or drive the discharge stage 206 into the ON state based on the detection signal $I_{DETECT}$. For example, in some embodiments, the detection signal $I_{DETECT}$ may not have sufficient magnitude, or is deficient in some other aspect, to activate the discharge stage 206 alone. Accordingly, the driver stage 204 can aid in activating the discharge stage 206. In some embodiments, the driver stage 204 can continue to generate the first and second activation signals $I_{ON,U}$, $I_{ON,L}$ for a period of time after the detection signal $I_{DETECT}$ has terminated.

The upper and lower drivers 210, 212 are configured to generate the first and second activation signals $V_{ON,U}$, $V_{ON,L}$, respectively, based on the detection signal $I_{DETECT}$. Each of the upper and lower drivers 210, 212 can include n gain stages. The number of gain stages n can be selected to be in the range of, for example, 1 to 10. Other numbers can be readily determined by one of ordinary skill in the art. In BJT-based embodiments, the number of gain stages can be selected based on, for example, common-emitter gain, common-collector gain, common-base gain, current gain β multiplication, and/or the cut-off frequency $f_t$ of the BJTs. Using two or more gain stages can aid in overcoming low current amplification (for example, low current gain β) of individual BJTs implemented by CMOS processes. Various embodiments of the driver stage 204 will be described below with reference to FIGS. 4 and 5.

The discharge stage 206 can include circuitry configured to switch between, and operate in, the OFF state (for example, high-impedance/low-current state) and the ON state (for example, low-impedance/high-current state) in accordance with the second activation current $I_{ON}$. For example, the illustrated discharge stage 206 includes the upper discharge element 214 and the lower discharge element 216. The upper discharge element 214 is configured to receive the first activation signal $V_{ON,U}$ and to switch to the ON state when the upper driver 210 is activated. The lower discharge element 216 is configured to receive the second activation signal $V_{ON,L}$ and to switch to the ON state when the lower driver 212 is activated. When both the upper discharge element 214 and the lower discharge element 216 are in the ON state, the discharge stage is in the ON state and a low-impedance current path between the first and second nodes $N_1$, $N_2$ is open, shunting current $I_{SHUNT}$ from a transient electrical event away from the core circuit 110 of FIG. 1.

The OFF state impedance can be in, for example, the range of about 300 gigaohms (GΩ) to about 600 GΩ, thereby reducing or minimizing power consumption of the protection circuit 108 during normal operation. The ON state impedance can be in, for example, the range of about 1Ω to about 5Ω, thereby reducing power consumption of the core circuit 110 of FIG. 1 during stress conditions. The shunt current $I_{SHUNT}$ of the ON state can be, for example, in the range of about 600 milliamps (mA) to about 3 amps (A), thereby aiding in protecting an IC from a transient electrical event. It will be appreciated by one skilled in the art that the shunt current $I_{SHUNT}$ of the ON state can vary dependently on the magnitude of the transient electrical event. The circuitry of the discharge stage 206 can be configured to remain in the ON state for a duration determined by the first and second activation signals $V_{ON,U}$, $V_{ON,L}$ as indicated above, and thereafter the discharge stage 206 can return to the OFF state. One example embodiment of the discharge stage 206 will be described below in connection with FIG. 7.

In some embodiments, it can be desirable for the conductance of the protection circuit 108 to change by many orders of magnitude over a short amount of time. Thus, it can be desirable for the discharge stage 206 to transition between the OFF state and the ON state in a relatively short amount of time, for example, between about 0.1 picoseconds (ps) and about 100 ps, and at a voltage less than that associated with over-voltage conditions, junction breakdown of internal devices, or damage to an IC. Although the detection signal $I_{DETECT}$ and the first and second activation signals $V_{ON,U}$, $V_{ON,L}$ are shown as having a particular polarity, in alternative embodiments, the polarity of each current can be reversed. Additionally, the detection signal $I_{DETECT}$ is shown as a current signal, and the first and second activation signals $V_{ON,U}$, $V_{ON,L}$ are shown as voltage signals, although in certain embodiments the information carried by each signal can be indicated by other applicable electrical characteristics.

The overvoltage protection circuit 208 can include circuitry configured to inhibit the discharge stage from entering an overvoltage condition. For example, the illustrated overvoltage protection circuit 208 provides a reference voltage $V_R$ to the discharge stage. In particular, a node of the discharge stage 206 may vary with operating conditions (such as DC bias or temperature) or vary over time. The reference voltage $V_R$ can aid in increasing stability at the node and preventing the node from creating an overvoltage condition, for example, at the upper discharge element 214 and/or the lower discharge element 216. Additionally or alternatively, the overvoltage protection circuit 208 can inhibit activation of the discharge stage 206 during normal operation. One example embodiment of the overvoltage protection circuit 208 will be described below in greater detail with reference to FIG. 7.

Figure 3:
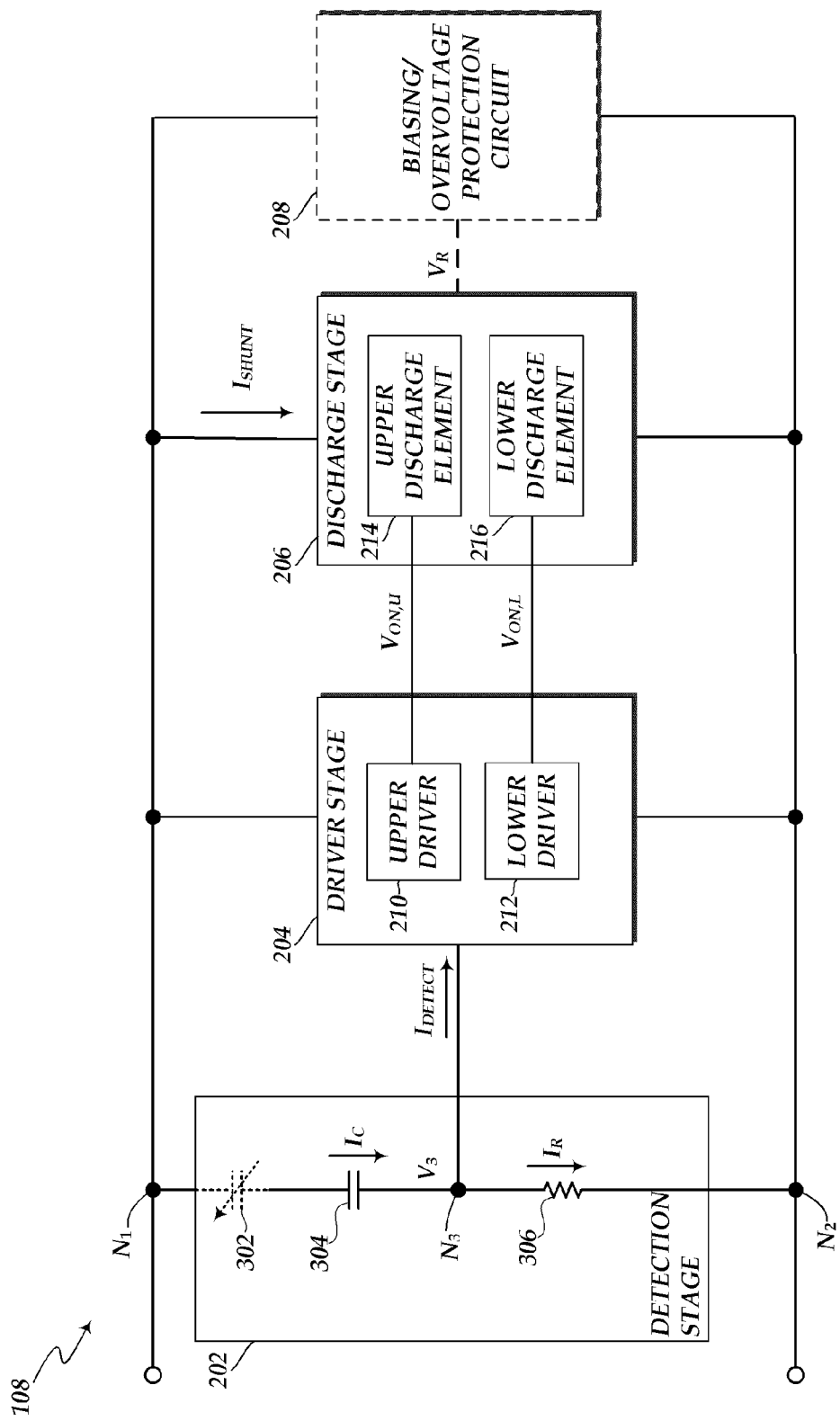
FIG. 3 is a schematic diagram illustrating an electronic protection circuit of FIG. 2 with an example embodiment of the detection stage.

FIG. 3 is a schematic diagram illustrating the electronic protection circuit 108 with an example embodiment of the detection stage 202 of FIG. 2. The illustrated detection stage 202 includes an variable capacitor ("varcap") 302, a capacitor 304, and a resistor 306. The varcap 302 includes a first terminal electrically coupled to the first node $N_1$ and a second terminal electrically coupled to a first terminal of the capacitor 304. The capacitor 304 further includes a second terminal electrically coupled to a third node $N_3$. The resistor 306 includes a first terminal electrically coupled to the third node $N_3$ and a second terminal electrically coupled to the second node $N_2$. The third node $N_3$ can be electrically coupled to the driver stage 204 and can be configured to carry the detection signal $I_{DETECT}$. The detection signal $I_{DETECT}$ can be provided to one or more of the upper driver 210 or the lower driver 212.

The first node $N_1$ can begin at a substantially constant supply voltage (for example, $V_{DD}$) and the second node $N_2$ can begin at a ground voltage. The illustrated detection stage 202 can be configured to generate the detection signal $I_{DETECT}$ in response to a transient electrical event having a particular rate of change of voltage. The current $I_C$ injected by the varcap 302 and the capacitor 304 can be approximately proportional to the rate of change $d(V_1-V_3)/dt$, where $V_1$ is the voltage at the first node $N_1$ and $V_3$ is the voltage at the third node $N_3$. Accordingly, during approximately DC operating conditions, the current $I_C$ can be substantially zero, the current $I_R$ across the resistor 306 can be substantially zero, and the voltage $V_3$ at the third node $N_3$ can be substantially pulled down to the voltage $V_2$ of the second node $N_2$.

When the first node $N_1$ experiences a rate of change of voltage of at least a particular magnitude for a sufficient duration due to a transient electrical event, the current $I_C$ through the capacitor 304 and the current $I_R$ through the resistor 306 can increase, raising the voltage $V_3$ and thus providing an indication that transient electrical event has been detected. As described below in greater detail, an increased voltage $V_3$ can generate the detection signal $I_{DETECT}$. Furthermore, as the voltage $V_3$ at the node $N_3$ increases, the current $I_C$ from the capacitor 304 decreases, and the voltage $V_3$ of the node $N_3$ returns to about the voltage $V_2$ of the node $N_2$. Accordingly, after a transient electrical event, the detection signal $I_{DETECT}$ can terminate.

In one embodiment, the combined capacitance of the varcap 302 and the capacitor 304 can each be selected to be in the range of about 1.5 picofarads (pF) to about 10 pF, and the resistance of the resistor 306 can be selected to be in the range of about 20 kiloohms (kΩ) to about 200 kΩ. In embodiment, the varcap 302 and the capacitor are each selected to have a capacitance of about 4.6 pF, and the resistor 306 is selected to have a resistance of about 100 kΩ. The resistance of the resistor 306 can be selected such that the time it takes to charge the varcap 302 and the capacitor 304 can be substantially determined by the capacitances of the varcap 302 and the capacitor 310 and the magnitude of the detection signal $I_{DETECT}$, while functioning to bias the node $N_3$ at a voltage equal to about the voltage of the second node $N_2$ under steady-state DC conditions. Other applicable capacitances and resistances can be readily determined by one of ordinary skill in the art.

Reducing the resistance and the capacitance of the detection stage 202 can be beneficial in some instances for reducing cost and chip area. However, a reduction in a time constant associated with the varcap 302, the capacitor 304, and the resistor 306 can reduce the duration of the detection signal $I_{DETECT}$. In some embodiments, the detection stage 202 can be configured to generate the detection signal $I_{DETECT}$ for a duration less than the duration of the transient electrical event. For example, after detecting a transient electrical event and generating a detection signal $I_{DETECT}$, the detection stage 202 can terminate or cease the detection signal $I_{DETECT}$ before the completion of the transient electrical event while the transient electrical event is still potentially disruptive or harmful to the core circuit 110 (for example, during the stress time). It will be appreciated that the detection signal $I_{DETECT}$ has terminated or ceased when, for example, $I_{DETECT}$ no longer has a magnitude sufficient for actively maintaining the driver stage 204 in an activated state. Reduced activation time of the detection stage 202 can be compensated by the driver stage 204, as described in greater detail in connection with FIG. 5.

As another example, the transient electrical event can correspond to over-stress condition having a duration substantially longer than the stress time for which the detection stage 202 was designed to cover. Some transient electrical events can be characterized by a rise-time period of rapid change (thereby increasing $V_3$) followed by a period of comparatively slow decay (thereby decreasing $V_3$). This slow decay can be seen as being approximately DC by the detection stage 202. Accordingly, the detection stage 202 can terminate the detection signal $I_{DETECT}$ while the transient electrical event is potentially disruptive if it decays slowly. As stated, reduced activation time of the detection stage 202 can be compensated by the driver stage 204, as described in greater detail in connection with FIG. 5.

In some embodiments, the detection stage 202 can be configured to generate the detection signal $I_{DETECT}$ for a predetermined time period. For example, the predetermined time period can be less than a typical stress time of a transient electrical event, for example, a time ranging between about 25 ns to about 100 ns. For another example, the predetermined time period can be approximately equal or greater than a typical stress time of a transient electrical event, for example, a time ranging between about 100 ns to about 1000 ns.

Figure 4:
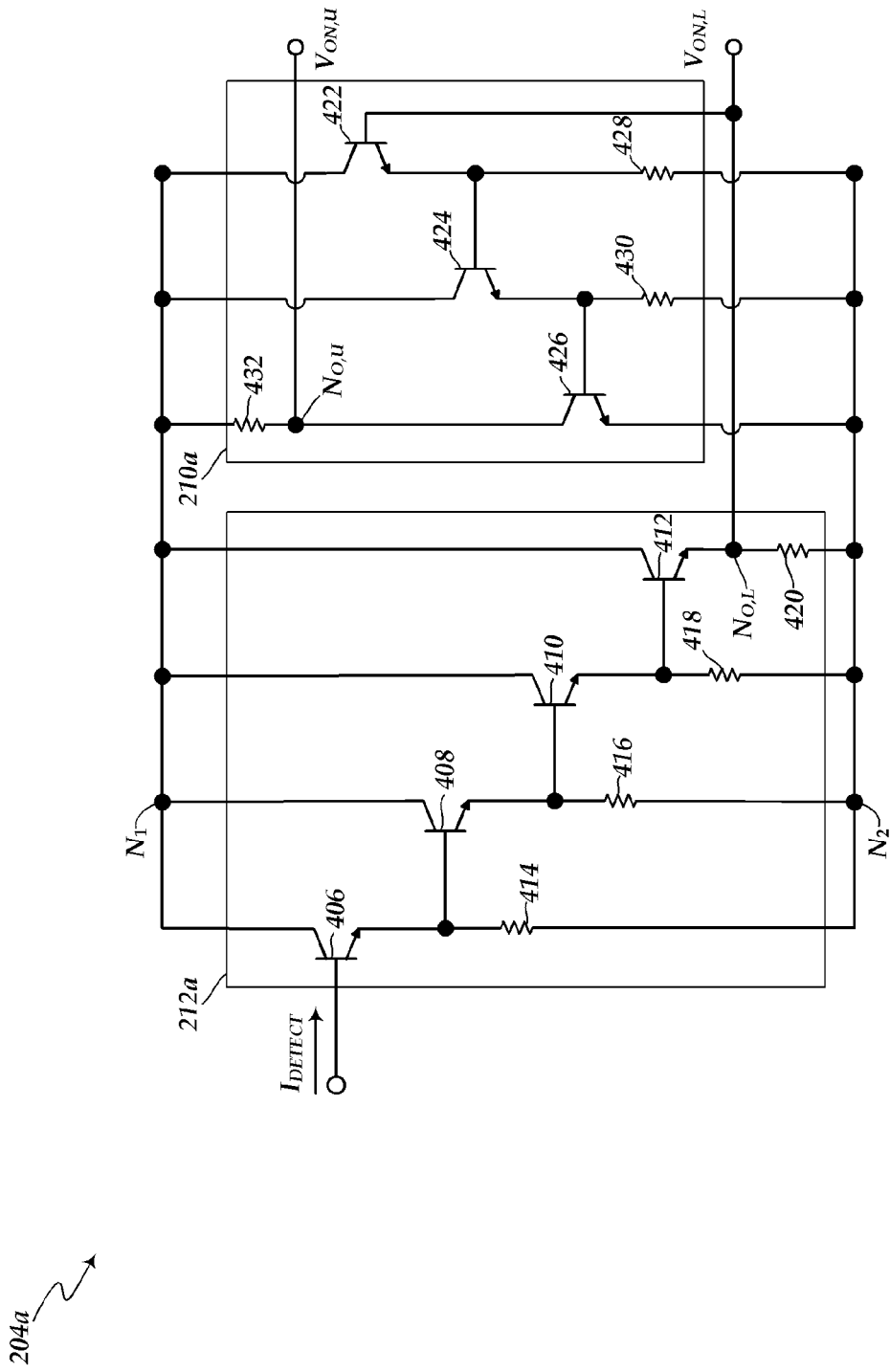
FIG. 4 is a circuit diagram illustrating one embodiment of a driver stage of the protection system of FIG. 2.

FIG. 4 is a circuit diagram illustrating one embodiment of a driver stage 204a of the protection circuit 108 of FIG. 2. The illustrated driver stage 204a includes an upper driver 210a and a lower driver 212a. The lower driver 212a can include one or more transistors, such as NPN BJTs 406, 408, 410, 412 and one or more loads, such as resistors 414, 416, 418, 420. The upper driver 210a can include one or more transistors, such as NPN BJTs 422, 424, 426, and one or more loads, such as resistors 428, 430, 432.

The illustrated driver stage 204a has a folded Darlington configuration. For example, in the illustrated embodiment, the lower driver 212a is configured to receive the detection signal $I_{DETECT}$ as an input and to generate the second activation signal $V_{ON,L}$ as an output, wherein the BJTs 406, 408, 410, 412 can provide amplification. The upper driver 210a is configured to receive the second activation signal $V_{ON,L}$ as an input and to generate the first activation signal $V_{ON,U}$ as an output, wherein the BJTs 422, 424, 426 can provide amplification.

For example, the NPN BJTs 406, 408, 410, 412 of the illustrated lower driver 212a each have a base, a collector, and an emitter. The base of the NPN BJT 406 is configured to receive the detection signal $I_{DETECT}$ at an input of the driver stage 204a. The collectors of each of the NPN BJTs 406, 408, 410, 412 are operatively coupled to the first node $N_1$. The emitter of the NPN BJT 406 is operatively coupled to a first terminal of the resistor 414 and the base of the NPN BJT 408, and a second terminal of the resistor 414 is operatively coupled to the second node N2. The emitter of the NPN BJT 408 is operatively coupled to a first terminal of the resistor 416 and the base of the NPN BJT 410, and a second terminal of the resistor 416 is operatively coupled to the second node $N_2$. The emitter of the NPN BJT 410 is operatively coupled to a first terminal of the resistor 418 and the base of the NPN BJT 412, and a second terminal of the resistor 418 is operatively coupled to the second node N2. The emitter of the NPN BJT 412 is operatively coupled to a first terminal of the resistor 420 at an output node $N_{O,L}$ of the lower driver 212a to provide the second activation signal $V_{ON,L}$. The resistor 420 has a second terminal operatively coupled to the second node $N_2$.

Additionally, the NPN BJTs 422, 424, 426 of the illustrated upper driver 210a each have a base, a collector, and an emitter. The base of the NPN BJT 422 is operatively coupled to the output node $V_{ON,L}$ to receive the second activation signal $V_{ON,L}$ as an input of the upper driver 210a. The collectors of each of the NPN BJTs 422, 424 are operatively coupled to the first node $N_1$. The emitter of the NPN BJT 422 is operatively coupled to a first terminal of the resistor 428 and the base of the NPN BJT 424, and a second terminal of the resistor 428 is operatively coupled to the second node $N_2$. The emitter of the NPN BJT 424 is operatively coupled to a first terminal of the resistor 430 and the base of the NPN BJT 426, and a second terminal of the resistor 430 is operatively coupled to the second node $N_2$. The collector of the NPN BJT 426 is operatively coupled to a first terminal of the resistor 432 at an output node $N_{O,U}$ of the upper driver 210a to provide the first activation signal $V_{ON,U}$. The resistor 432 has a second terminal operatively coupled to the first node $N_1$. The emitter of the NPN BJT 426 is operatively coupled to the second node N2.

In operation, the detection signal $I_{DETECT}$ forward biases the base-emitter junction of the NPN BJT 406 and activates it in an ON state (for example, operating in the forward-active or saturation modes). In the ON state, the NPN BJT 406 is configured to conduct a current across its collector and emitter and to forward bias and the NPN BJT 408. Accordingly, the NPN BJT 408, in turn, activates in the ON state. In the ON state, the NPN BJT 408 is configured to conduct a current across its collector and emitter and to forward bias the base-emitter junction of the NPN BJT 410. Accordingly, the NPN BJT 410, in turn, activates in the ON state. In the ON state, the NPN BJT 410 is configured to conduct a current across its collector and emitter and to forward bias the base-emitter junction of the NPN BJT 412. Accordingly, the NPN BJT 412, in turn, activates into the ON state. In the ON state, the NPN BJT 412 is configured to conduct a current across its collector and emitter. At least a portion of the emitter current of the NPN BJT 412 flows through the resistor 420 and pulls up the second activation signal $V_{ON,L}$ high, signaling activation. When the NPN BJT 412 is in the OFF state, the resistor 420 pulls down the second activation signal $V_{ON,L}$ low to approximately the voltage of the first node $N_1$, signaling deactivation.

When pulled high, the second activation signal $V_{ON,L}$ forward biases the base-emitter junction of the NPN BJT 422 and activates it in the ON state. In the ON state, the NPN BJT 422 is configured to conduct a current across its collector and emitter and to forward bias the base-emitter junction of the NPN BJT 424. Accordingly, the NPN BJT 424 activates in the ON state. In the ON state, the NPN BJT 424 is configured to conduct a current across its collector and emitter and to forward bias the base-emitter junction of the NPN BJT 426. Accordingly, the NPN BJT 426 activates in the ON state. In the ON state, the NPN BJT 426 is configured to conduct a current across its collector and emitter. At least a portion of the emitter current of the NPN BJT 426 flows through the resistor 432 and pulls down the first activation signal $V_{ON,U}$ low, signaling activation. When the NPN BJT 426 is in the OFF state, the resistor 432 pulls up the first activation signal $V_{ON,U}$ to approximately the voltage of the first node $N_1$, signaling deactivation.

The resistors 414, 416, 418, 420, 428, 430, 432 can be configured to reduce standing leakage of the upper and lower drivers 210a, 212a. Additionally or alternatively, the resistors 414, 416, 418, 420, 428, 430, 432 can be configured to increase current amplification of the upper and lower drivers 210a, 212a. For example, in one embodiment, the resistors 414 can have a resistance from about 20 kΩ to about 200 kΩ and 416, 418, 420, 428, 430, 432 can have a resistance from about 1 kΩ to about 50 kΩ. In one specific embodiment, the resistor 414 can have a resistance of about 100 kΩ and the resistors 416, 418, 420, 428, 430, 432 can have a resistance of about 34 kΩ.

The NPN BJTs 406, 408, 410, 412, 422, 424, 426 can be sized to respond effectively to the detection signal $I_{DETECT}$—for example, with respect to response time and reliability, and the like characteristics in relation to the expected transient electrical events of the application. In one embodiment, the NPN BJTs 406, 408, 410, 412, 422, 424, 426 each have a total emitter area selected to be in the range of about 50 square micrometers ($\mu m^2$) to about 500 $\mu m^2$. In one particular embodiment, the NPN BJTs 406, 408, 410, 412, 422, 424, 426 can each have a total emitter area selected to be 300 $\mu m^2$. For example, each of the NPN BJTs 406, 408, 410, 412, 422, 424, 426 can have an emitter composed of three stripes, each stripe having a width of about 10 micrometers ($\mu m$) and a length of about 10 $\mu m$. Other applicable emitter areas can be readily determined by one of ordinary skill in the art.

Figure 5:
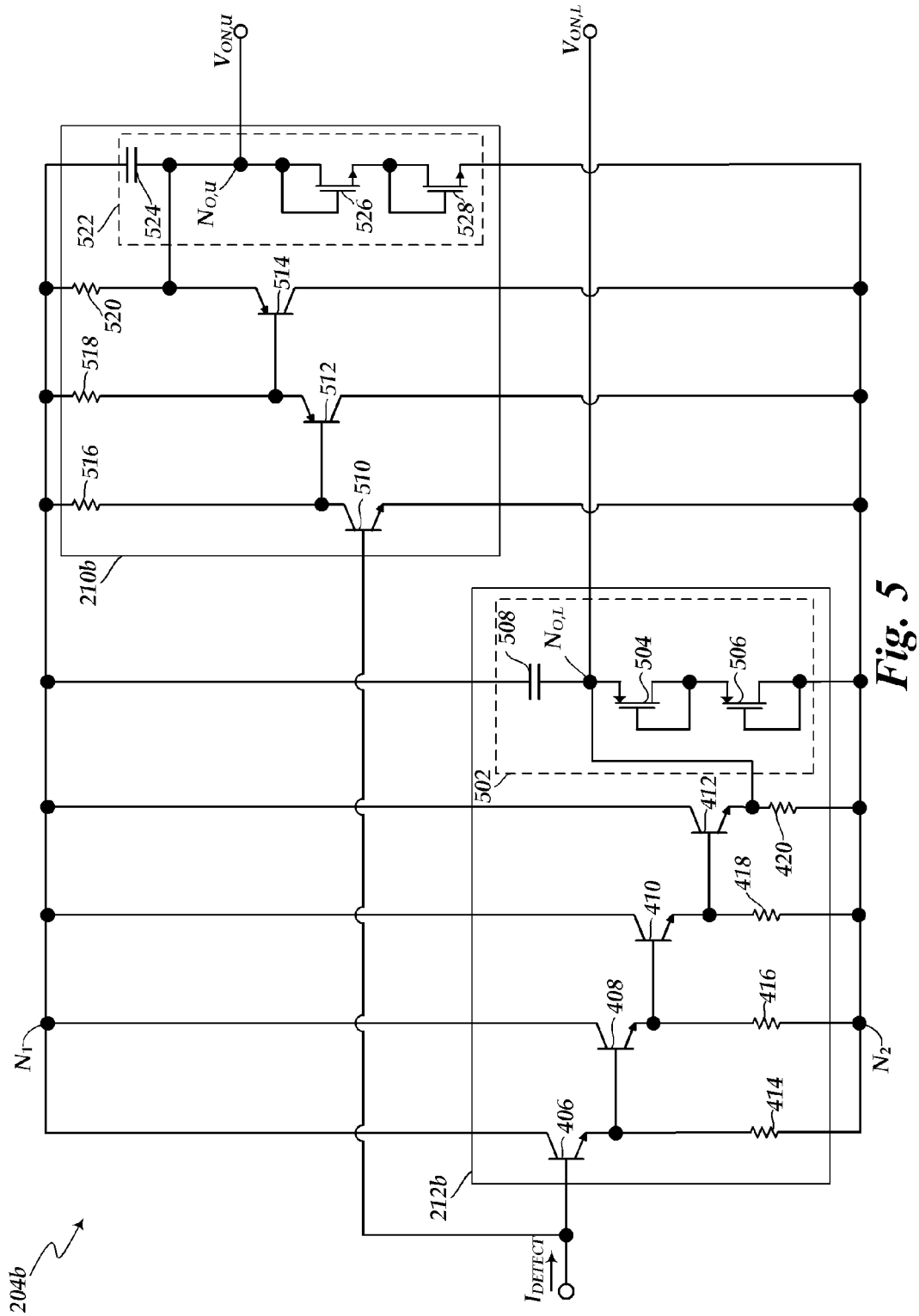
FIG. 5 is a circuit diagram illustrating another embodiment of a driver stage of the protection system of FIG. 2.

FIG. 5 is a circuit diagram illustrating another embodiment of a driver stage 204b of the protection circuit 108 of FIG. 2. Elements common to FIGS. 4 and 5 share common reference indicia, and only differences between the Figures are described herein for the sake of brevity.

The illustrated driver stage 204b includes an upper driver 210b and a lower driver 212b. The lower driver 212b can include one or more transistors, such as NPN BJTs 406, 408, 410, 412; one or more impedances, such as resistors 414, 416, 418, 420; and a lower reference voltage circuit 502. The lower reference voltage circuit 502 includes one or more diode-connected transistors (for example, coupling the gate and the drain), such as FETs 504, 506, and a capacitor 508. The upper driver 210b can include one or more transistors, such as an NPN BJT 510 and PNP BJTs 512, 514; one or more impedances, such as resistors 516, 518, 520; and an upper reference voltage circuit 522. The upper reference voltage circuit 522 includes one or more diode-connected transistors, such as FETs 526, 528, and a capacitor 524. It will be appreciated that in some embodiments of the driver stage 204b the lower reference voltage circuit 502 and/or the upper reference voltage circuit 522 can be omitted.

As shown, the driver stage 204b can have a parallel-driver configuration. For instance, the illustrated lower driver 212b is configured to receive the detection signal $I_{DETECT}$ as an input from a first input path and to generate the second activation signal $V_{ON,L}$ as an output. Independently, the illustrated upper driver 210b is configured to receive detection signal $I_{DETECT}$ as an input from a second input path and to generate the first activation signal $V_{ON,U}$ as an output.

For example, the NPN BJTs 406, 408, 410, 412 and the resistors 414, 416, 418, 420 of the lower driver 212a are configured in a manner similar to the lower driver 212a of FIG. 4. Additionally, the lower reference voltage circuit 502 can be operatively coupled to the output node $N_{O,L}$ and between the first and second nodes $N_1$, $N_2$. For example, the illustrated lower reference voltage circuit 502 includes the one or more diode-connected transistors 504, 506 connected in series with one end of the lower reference voltage circuit 502 operatively coupled to the output node $N_{O,L}$ and a second end of the lower reference voltage circuit 502 operatively coupled to the second node $N_2$. The illustrated lower reference voltage circuit 502 also includes the capacitor 508 with a first terminal operatively coupled to the first node $N_1$ and a second terminal operatively coupled to the output node $N_{O,L}$.

With reference to the illustrated upper driver 210b, the NPN BJT 510 and the PNP BJTs 512, 514 each have a base, a collector, and an emitter. The base of the NPN BJT is configured to receive the detection signal $I_{DETECT}$. The collector of the NPN BJT 510 is operatively coupled to a first terminal of the resistor 516 and the base of the PNP BJT 512, and a second terminal of the resistor 516 is operatively coupled to the first node $N_1$. The emitter of the NPN BJT 510 is operatively coupled to the second node $N_2$. The emitter of the PNP BJT 512 is operatively coupled to a first terminal of the resistor 518 and the base of the PNP BJT 514. The resistor 518 has a second terminal operatively coupled to the first node $N_1$. The collector of the PNP BJT 512 is operatively coupled to the second node $N_2$. The emitter of the PNP BJT 514 is operatively coupled to a first terminal of the resistor 520 at an output node $N_{O,U}$ to provide the first activation signal $V_{ON,U}$. The resistor 520 has a second terminal operatively coupled to the first node $N_1$. The collector of the PNP BJT 514 is operatively coupled to the second node $N_2$.

Additionally, the upper reference voltage circuit 522 can be operatively coupled to the output node $N_{O,U}$ and between the first and second nodes $N_1$, $N_2$. For example, the illustrated upper reference voltage circuit 522 includes the one or more diode-connected transistors 526, 528 connected in series with one end of the series operatively coupled to the output node $N_{O,U}$ and a second end of the series operatively coupled to the second node $N_2$. The illustrated upper reference voltage circuit 522 also includes the capacitor 524 with a first terminal operatively coupled to the output node $N_{O,L}$ and a second terminal operatively coupled to the second node $N_2$.

In operation, the detection signal $I_{DETECT}$, when set high, can forward bias the base-emitter junctions of each of the NPN BJTs 406, 408, 410, 412 of the lower driver 212b and pull up the second activation signal $V_{ON,L}$ in a manner similar in operation as described with reference to the lower driver 212a of FIG. 4. The detection signal $I_{DETECT}$, when set high, can additionally forward bias the base-emitter junction of the NPN BJT 510 of the upper driver 210b and can activate it in an ON state. In the ON state, the NPN BJT 510 is configured to conduct a current across its collector and emitter and to forward bias the base-emitter junction of the PNP BJT 512 of the upper driver 210b. Accordingly, the PNP BJT 512 activates in the ON state. In the ON state, the PNP BJT 512 is configured to conduct a current across its collector and emitter and to forward bias the base-emitter junction of the PNP BJT 514. At least a portion of the emitter current of the PNP BJT 514 flows through the resistor 520 and pulls down the first activation signal $V_{ON,U}$ low, signaling to activation. When the PNP BJT 514 is in the OFF state, the resistor 432 pulls up the first activation signal $V_{ON,U}$ low to approximately the voltage of the first node $N_1$.

In addition, the upper and lower reference voltage circuits 522, 502 can provide reference voltages at the output nodes $N_{O,U}$, $N_{O,L}$. For example, the one or more diode-connected transistors 504, 506 of the lower driver 212b can be configured to activate when the NPN BJTs 406, 408, 410, 412 activate in the ON state and pull up $V_{ON,L}$. Accordingly, each of the one or more diode-connect transistors 504, 506 can provide approximately a diode drop (for example, from about 0.7 V to about 1.25 V) when activated. Thus, the lower reference voltage circuit 522 inhibits the second activation signal $V_{ON,U}$ from raising above a predetermined voltage level—e.g., in the illustrated embodiment, the second activation signal $V_{ON,U}$ becomes clamped when its voltage corresponds to about two diode drops above the voltage of the second node $N_2$. In addition, the one or more diode-connected transistors 526, 528 of the upper driver 210b can be configured to activate when the NPN BJT 510 and the PNP BJTs 512, 514 of the upper driver 210b activate in the ON state and pull down $V_{ON,U}$. Accordingly, each of the one or more diode-connect transistors 526, 528 can provide approximately a diode drop from the voltage of the second node $N_2$, thereby clamping the first activation signal $V_{ON,U}$.

In one aspect, the one or more diode-connected transistors of the upper reference voltage circuits 522 can aid in increasing the time the protection circuit 108 remains activated and thus providing protection against some overstress condition, such as a long-duration transient electrical event. For example, a long-duration electrical event may rapidly increase (activating the protection circuit 108) followed by an extended peak time. During the peak time, if the voltage of the transient electrical event is not changing substantially with time, the detection stage 202 may sense this activity as a steady state condition and weaken or terminate the detection signal $I_{DETECT}$ while the transient electrical event is still potentially damaging. For example, turning for the moment to FIG. 3, if during a long-duration peak time, the rate of change of the voltage at the first node $N_1$ is small, the voltage across the resistor 306 can drop and the detection signal $I_{DETECT}$ can decay. Returning to FIG. 5, when the detection signal $I_{DETECT}$ weakens, the voltage $V_{ON,U}$ at the output node $N_{O,U}$ should begin to become pulled up to the voltage of the first node $N_1$. In particular, the PNP BJTs 512, 514 can have lower current gain β than the NPN BJTs 406, 408, 410, 412, 510 and thus can deactivate at comparatively stronger detection signal $I_{DETECT}$. However, if the upper reference voltage circuit 522 is included, the upper reference voltage circuit 522 should inhibit the first activation signal $V_{ON,U}$ from being pulled to the voltage of $N_1$ by clamping the first activation signal $V_{ON,U}$ at approximately two diode drops from the second node $N_2$ for a period. Eventually the current passing through diode-connected transistors 526, 528 should weaken to the point that the transistors 526, 528 deactivate and the first activation signal $V_{ON,U}$ is pulled all the way to the second node $N_2$. In at least this way, the upper reference voltage circuit 522 is configured to increase the duration of the first activation signal $V_{ON,U}$ and the duration that the upper discharge element 214 remains activated. In addition, the upper reference voltage circuit 522 can aid in implementing the driver stage 204 using CMOS parasitic BJT devices (described in greater detail below in connection with FIGS. 6A and 6B) having relatively low current gain β.

In one aspect, the lower reference voltage circuit 502 can inhibit the second activation signal $V_{ON,U}$ from being raised above a voltage level. For example, as described above, the lower reference voltage circuit 502 is configured to inhibit the second activation signal $V_{ON,U}$ from being raised above about the diode drops of the one or more diode-connected transistors 504, 506 above the second node $N_2$. In some embodiments, the second activation signal $V_{ON,L}$ is provided to a gate of a transistor of the discharge stage 206 (for example, the NMOS 716 described below in connection with FIG. 7). Accordingly, the lower reference voltage circuit 502, by maintaining a lower gate voltage during activation, can aid in reducing the on-state resistance $r_o$ of the transistor of the discharge stage 206 coupled to the second activation signal $V_{ON,U}$.

Additionally, the capacitor 524 of the upper voltage reference circuit 522 can provide additional charge to the output node $N_{O,U}$ to increase the duration of the first activation signal $V_{ON,U}$ relative to the activation signal that would have been generated had the capacitor 524 not been included. For example, during activation, the capacitor 524 is configured to store charge when the first activation signal $V_{ON,U}$ is pulled down and is configured to release the stored charge as the BJTs 510, 512, 514 transition OFF and the first activation signal $V_{ON,U}$ is pulled back to the first node $N_1$, thereby increasing the duration of the first activation signal $V_{ON,U}$. Likewise, the capacitor 508 of the lower voltage reference circuit 502 can provide additional charge to the output node $N_{O,L}$ to increase the duration of the second activation signal $V_{ON,L}$ relative to the activation signal that would have been generated had the capacitor 508 not been included.

The resistors 516, 518, 520 can be configured to reduce standing leakage of the upper driver 210a. Additionally or alternatively, the resistors 516, 518, 520 can be configured to increase amplification of the upper driver 210b. For example, in one embodiment, the resistors 516, 518, 520 can have a resistance from about 1 kΩ to about 50 kΩ.

The capacitors 508, 524 can be configured to aid in providing activation signals $V_{ON,U}$, $V_{ON,L}$ having effective response times and durations. For example, in one embodiment, the capacitors 508, 524 can have a capacitance from about 100 fF to about 5 pF.

The NPN BJT 510 can be sized to respond effectively to the detection signal $I_{DETECT}$—for example, based on considerations such as response time, turn-on duration, and reliability, relative to the expected transient electrical events of the application. In one embodiment, the NPN BJT 510 can have a total emitter area selected to be in the range of about 50 square μm$^2$ to about 500 μm$^2$. In one particular embodiment, the NPN BJT 510 has a total emitter area selected to be 200 μm$^2$. For example, the NPN BJT 510 can have an emitter composed of 2 stripes, each stripe having a width of about 10 μm and a length of about 10 μm. Other applicable emitter area can be readily determined by one of ordinary skill in the art.

The PNP BJTs 512, 514 can be sized to respond effectively to the detection signal $I_{DETECT}$—for example, based on considerations such as response time, turn-on duration, and reliability, relative to the expected transient electrical events of the application. In one embodiment, the PNP BJTs 512, 514 can each have a total emitter area selected to be in the range of about 50 μm$^2$ to about 500 μm$^2$. In one particular embodiment, the PNP BJTs 512, 514 each have a total emitter area selected to be 300 μm$^2$. For example, each of the PNP BJTs 512, 514 can have an emitter composed of 3 stripes, each stripe having a width of about 10 μm and a length of about 10 μm. Other applicable emitter areas can be readily determined by one of ordinary skill in the art.

The diode-connected FETs 504, 506, 526, 528 can be sized to provide a reference voltage effective for maintaining activation signals $V_{ON,U}$, $V_{ON,L}$. In one embodiment, the diode-connected FETs 504, 506, 526, 528 are each selected to have a length between about 50 to about 500 and a width between about 1 μm to about 10 μm. Other applicable lengths and widths will be readily determined by one of ordinary skill in the art. The diode-connected FETs 504, 506, 526, 528 can correspond to insulated gate field-effect transistors, such as MOSFETs. However, it will be understood that a gate can be made from materials other than metals, such as polysilicon, and an insulation layer can be made out of materials other than silicon oxide, such as a high k dielectric. It will also be understood that the diode-connected FETs 504, 506, 526, 528 can have various structural types other than MOSFETs, including, but not limited to, BJT, JFET, IGFET, MESFET, pHEMT, HBT, and the like transistor structural types. Further, the diode-connected FETs 504, 506, 526, 528 can also have various polarities, such as N-channel, P-channel, NPN-type, and PNP-type; and can include various semiconductor materials, such as Si, SiC, GaAs, GaN, SiGe, and the like.

FIGS. 6A and 6B are schematic diagrams illustrating cross sections of embodiments of BJTs that can be included in the upper and lower driver circuits 210, 212 of FIG. 2. The illustrated BJTs can correspond to, for example, one or more BJTs of the upper and lower drivers 210a, 212a, 210b, 212b described in connection with FIGS. 4 and 5.

In the illustrated embodiment of FIG. 6A, the PNP BJT 512a is configured to conduct current as described in greater detail below. The PNP BJT 512a includes a semiconductor substrate 602, such as, but is not limited to, a semiconductor material doped with p-type dopants. The semiconductor substrate 602 can include an n-type well 604, a first collector region 606, and a second collector region 608. The n-type well 604 can include a first base region 610, a second base region 612, and an emitter region 614. In the illustrated embodiment, the semiconductor substrate 602 includes shallow trench isolation (STI) regions 616, 618, 620, 621. The PNP BJT 512a can advantageously be formed by a CMOS and/or full CMOS process, which can reduce production costs versus a Bi-CMOS process.

The semiconductor substrate 602 can be formed from silicon, silicon carbide, germanium, gallium arsenide, gallium nitride, silicon germanium, and/or the like semiconductor materials. The semiconductor substrate 602 can be doped, for example, lightly doped with a p-type dopant. The first and second collector regions 606, 608 and the emitter region 614 can be p-type regions. The n-type well 604 and the first and second base regions 610, 612 can be n-type regions. The collector, emitter, and base doped regions 606, 608, 610, 612, 614 can be heavily doped, and the n-type well 604 can be lightly doped. For example, the n-type well 604 can correspond to an n-doped epithelial region. It will be appreciated by one skilled in the art that other doping profiles can be chosen based on various considerations, such as for example, collector resistance, current amplification β, and the like performance characteristics.

The STI regions 616, 618, 620, 621 can include one or more dielectric materials deposited between the emitter, collector and base regions 616, 618, 620, 621. The STI regions 616, 618, 620, 621 can attenuate current leakage between adjacent regions 606, 608, 610, 612, 614. In some embodiments, the STI regions 616, 618, 620, 621 can aid in reducing the threshold voltage of the BJT device 512a.

The PNP BJT 512a, having the structure shown in FIG. 6A, can be configured to conduct current. For example, in the illustrated embodiment shown in FIG. 6A, emitter currents $i_{e1}$, $i_{e2}$ can flow laterally through the "base"—that is, the base can include the n-type well 604 and the base regions 610, 612—to the respective collector regions 606, 608 (by way of collector currents $i_{c1}$, $i_{c2}$). It will be appreciated that a portion of the emitter currents $i_{e1}$, $i_{e2}$ can flow to the respective base regions 610, 612 (by way of base currents $i_{b1}$, $i_{b2}$). Current flowing laterally includes current having an aggregate direction substantially parallel to the surface of the PNP BJT 512a. For example, the aggregate collector currents $i_{c1}$, $i_{c2}$ flowing through the base of the PNP BJT 512a is in a direction substantially parallel to the surface of the PNP BJT transistor 512a, opposed to, for example, vertically through the base to the semiconductor substrate 602, a p-type deep well (not shown), and/or buried p-type well (also not shown). Accordingly, in the illustrated embodiment, the collector currents $i_{c1}$, $i_{c2}$ do not substantially flow vertically into the semiconductor substrate 602 and then to collector regions 606, 608. It will be appreciated that some current may flow vertically across the junction of the n-type well 604 and p-type substrate 602. However, the net current flowing vertically across that junction should be small relative to the net lateral current—for example, the total vertical current can be less than about half the lateral current.

In one embodiment, the n-type well 604 has a depth $d_b$ that is sufficiently deep, relative to the depth $d_e$ of the emitter region 614, for inhibiting substantial current from flowing vertically between the emitter region 614 and the substrate 602 when the PNP BJT 512a is activated in the ON state. For example, the depth $d_b$ of the n-type well 604 can be selected in the range of about 200 nanometers (nm) to about 600 nm, and the depth $d_e$ of the emitter region 614 can be selected in the range of about 10 nm to about 100 nm.

Additionally or alternatively, variants of the PNP BJT 512a can include configurations in which the collector (for example, first and second collector regions 606, 608) and the emitter (for example, the emitter region 614) are arranged laterally, as shown in FIG. 6A. For example, the first and second collector regions 606, 608 and the emitter region 614 of the illustrated embodiment of FIG. 6A are arranged side-by-side (with possible intervening regions), when looking down at the surface of the BJT 512a (for example, down along the z dimension), and do not substantially overlap in such a way that the BJT 512a conducts the collector current $i_{c1}$, $i_{c2}$ across the base vertically.

One benefit, among others, of the PNP BJT 512a being configured as described above (for example, with side-by-side collector and emitter regions 606, 608, 614) is that the BJT 512a can be fabricated in a CMOS process. For example, a CMOS process can be used to fabricate at least the doped regions 604, 606, 608, 610, 612, 614 using CMOS feature definitions. In a specific embodiment, the CMOS process technology can correspond to a full CMOS process technology (opposed to, for example, a BiCMOS process). As such, in one embodiment, the collector regions 606, 608 can have a depth $d_c$ selected in the range of about 10 nm to about 100 nm and a width $w_c$ selected in the range of from about 1 μm to about 10 μm; the base regions 610, 612 can have a depth $d_{b+}$ selected in the range of about 10 nm to about 100 nm and a width $w_{b+}$ selected in the range of from about 500 nm to about 5 μm; and the emitter region 614 can have a depth $d_e$ selected in the range of about 10 nm to about 100 nm and a width $w_e$ selected in the range of from about 1 μm to about 10 μm. However, it will be appreciated by one skilled in the art that other suitable semiconductor process technologies and other suitable dimensions can be selected.

Accordingly, the PNP BJT 512a can correspond to a CMOS parasitic BJT device. CMOS parasitic devices can exhibit less current gain β and greater collector resistance than some BJT devices implemented using BJT native semiconductor processes (such as BiCMOS). In one embodiment, the PNP BJT 512a can have a current gain β in the range of about 1 to about 5. Additionally or alternatively, the PNP BJT 512a can have a collector resistance in the range of about 5Ω to about 20Ω.

FIG. 6B is a schematic diagram illustrating a cross section of another example embodiment of a BJT 406 that can be included in the upper and lower driver circuits 210, 212 of FIG. 2. The BJT structure 406 can correspond to, for example, to one or more NPN BJTs of the upper and lower drivers 210a, 212a, 210b, 212b described in connection with FIGS. 4 and 5. Elements common to both FIGS. 6A and 6B share common reference indicia, and only differences between the BJTs 512a, 406 are described herein for the sake of brevity.

In the illustrated embodiment of FIG. 6B, the NPN BJT 406 can be configured to conduct current as described in greater detail below. The NPN BJT structure 406 includes a semiconductor substrate 602 comprising a deep n-type well 622, a p-type well 624, and first and second n-type wells 626, 628. The first n-type well 626 and the second n-type well 628 can include a first collector region 630 and a second collector region 632, respectively. The p-type well 624 can include a first base region 634, a second base region 636, and an emitter region 638. In the illustrate embodiment, the semiconductor substrate 602 includes the STI regions 616, 618, 620, 621.

In the illustrated embodiment, the first and second n-type wells 626, 628, the first and second collector regions 630, 632, and the emitter region 638 can be n-type semiconductor regions. The first and second n-type wells 626, 628 can have a lower concentration of dopants relative to the first and second collector regions 630, 632 and the emitter region 638. The first and second collector regions 630, 632 and the emitter region 638 of the illustrated embodiment of FIG. 6B can be formed side-by-side on the surface of the semiconductor substrate 602. The p-type well 624 and the first and second base regions 634, 636 can be p-type semiconductor regions. The p-type well can have a lower concentration of dopants relative to the first and second base regions 634, 636.

As stated, the NPN BJT 406 can be configured to conduct current. For example, in the illustrated embodiment of FIG. 6B, at least a portion of the emitter currents $i_{e1}$ and $i_{e2}$ flow laterally through the base—the base includes the p-type well 624 and the base regions 634, 636—from the respective collector regions 630, 632 (by way of currents $i_{c1}$ and $i_{c2}$). It will be appreciated that some current may flow vertically across the junction of the p-type well 624 and the deep n-type well 622. However, the net current flowing vertically across that junction current should be small relative to the net lateral current—for example, the total vertical current can be less than about half the lateral current.

In one embodiment, the p-type well 624 has a depth $d_b$ that is sufficiently deep, relative to the depth $d_e$ of the emitter region 638, for inhibiting substantial current from flowing vertically between the emitter region 638 and the deep n-type well 622 when the BJT is activated in an ON state. For example, the depth $d_b$ of the p-type well 624 can be selected in the range of about 200 nm to about 600 nm, and the depth $d_e$ of the emitter region 638 can be selected in the range of about 10 nm to about 100 nm. In some embodiments, the depth $d_b$ of the p-type well 624 can be about 6 to about 100 times greater than the depth $d_e$ of the emitter region 638.

Additionally or alternatively, variants of the BJT 406 can include configurations in which the collector (for example, first and second collector regions 630, 632) and the emitter (for example, the emitter region 638) are arranged laterally, as shown in FIG. 6B. For example, the first and second collector regions 630, 632 and the emitter region 638 of the illustrated embodiment of FIG. 6B are arranged side-by-side (with possible intervening regions), when looking down at the surface of the BJT 406 (for example, down along the z dimension), and do not substantially overlap in such a way that the BJT 406 is configured to conduct the collector current $i_{c1}$, $i_{c2}$ across the base vertically.

One benefit, among others, of some embodiments including the NPN BJT 406 being configured as described above (for example, with side-by-side collector and emitter 606, 608, 614 regions) is that the BJT 406 can be fabricated in a CMOS process. For example, a CMOS process can be used to fabricate at least the doped regions 630, 632, 634, 636, 638 using CMOS feature definitions. In a specific embodiment, the CMOS process technology can correspond to a full CMOS process technology (opposed to, for example, a BiCMOS process). As such, in one embodiment, the collector regions 630, 632 can have a depth $d_c$ selected in the range of about 10 nm to about 100 nm and a width $w_c$ selected in the range of from about 1 μm to about 10 μm the base regions 634, 636 can have a depth $d_{b+}$ selected in the range of about 10 nm to about 100 nm and a width $w_{b+}$ selected in the range of about 1 μm to about 10 μm and the emitter region 638 can have a depth $d_e$ selected in the range of about 10 nm to about 100 nm and a width $w_e$ selected in the range of about 1 μm to about 10 μm. However, it will be appreciated by one skilled in the art that other suitable semiconductor process technologies and other suitable dimensions can be selected.

Accordingly, the NPN BJT 406 can correspond to a CMOS parasitic BJT device. As stated, CMOS parasitic devices can exhibit less current gain β and greater collector resistance than BJT devices implemented using BJT-native semiconductor processes. In one embodiment, the NPN BJT 406 can have a current gain β in the range of about 1 to about 5. Additionally or alternatively, the NPN BJT 406 can have a collector resistance in the range of about 5Ω to about 20Ω.

In one embodiment, the one or more BJTs of the upper driver 210 and the lower driver 212 of FIG. 2 consists only of BJT-type transistors, opposed to also including FET-type transistors. Additionally, in one embodiment, the one or more BJTs of the upper driver 210 and the lower driver 212 of FIG. 2 consists only of BJT-type transistors that correspond to either the PNP BJT 512a described in connection with FIG. 6A or the NPN BJT 406 described in connection with FIG. 6B.

Figure 7:
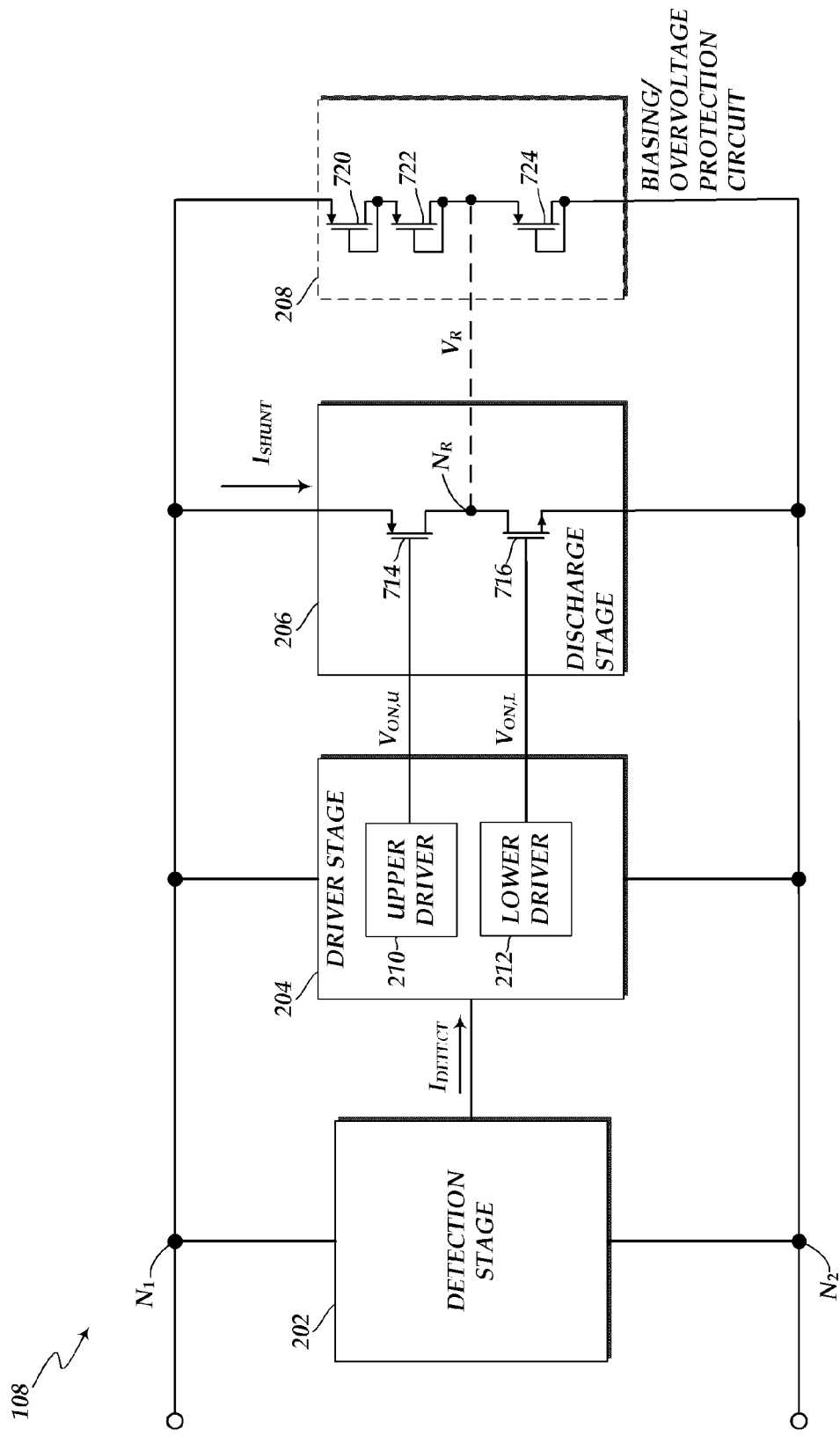
FIG. 7 is a schematic diagram illustrating the electronic protection circuit of FIG. 2 with example embodiments of the discharge stage and the biasing/overvoltage protection circuit.

FIG. 7 is a schematic diagram illustrating the electronic protection circuit 108 of FIG. 2 with example embodiments of the discharge stage 206 and the biasing/overvoltage protection circuit 208. The illustrated protection circuit 108 also includes the detection stage 202, the driver stage 204, the discharge stage 206, as described previously. The driver stage 204 includes upper and lower drivers 210, 212. The illustrated embodiment of the discharge stage 206 includes an upper discharge element, such a p-channel MOSFET ("PMOS") 714, and a lower discharge element, such as an n-channel MOSFET ("NMOS") 716. The illustrated embodiment of the overvoltage protection circuit 208 includes a voltage divider circuit, such as one or more diode-connected transistors 720, 722, 724. The detection stage 202 and the driver stage 204 can correspond to the like-referenced elements described in connection with FIGS. 2-6.

The PMOS 714 and the NMOS 716 are cascaded in series between the first node $N_1$ and the second node $N_2$ such that the source of the PMOS 714 is operatively coupled to the first node $N_1$, the drain of the PMOS 714 is operatively coupled to a reference node $N_R$, the drain of the NMOS 716 is operatively coupled to the reference node $N_R$, and the source of the NMOS 716 is operatively coupled to the second node $N_2$. In addition, the discharge stage 206 is configured to receive the first activation signal $V_{ON,U}$ with the gate of the PMOS 714, and configured to receive the second activation signal $V_{ON,L}$ with the gate of the NMOS 716.

In operation, the upper driver 210 can control the activation (for example, ON or OFF) of the PMOS 714, and the lower driver 212 can control the activation of the NMOS 716. For example, the upper driver 210 can pull the activation signal $V_{ON,U}$ low based on the detection signal $I_{DETECT}$ and thus activate the PMOS 714 in the ON state. Additionally, the lower driver 212 can pull the second activation signal $V_{ON,L}$ high based on the detection signal $I_{DETECT}$ and thus activate the NMOS 716 in the ON state. When both the PMOS 714 and the NMOS 716 are activated, the discharge stage 206 can be configured to open a conduction path from the first node $N_1$ across the source and drain of the PMOS 714 and across the drain and source of the NMOS 716 to the second node $N_2$. When the conduction path is open, the discharge stage 206 can conduct a shunt current $I_{SHUNT}$ across the PMOS 714 and the NMOS 716 and thereby diverting the current $I_{SHUNT}$ away from the core circuits (for example, core circuits 110) for a duration, for example, a period covering the stress time of the transient electrical event.

The illustrated overvoltage protection circuit 208 can be configured to provide or set a reference voltage $V_R$ at a node of the discharge stage 206. For example, the one or more diode connected transistors 720, 722, 724 can be connected in series between the first node $N_1$ and the second node $N_2$ to form a voltage divider configured to provide the voltage $V_R$ at the node $N_R$. In the case of the illustrated embodiment, each of the one or more diode-connected transistors 720, 722, 724 corresponds to a metal-oxide-semiconductor field effect transistor (MOSFET) providing a resistance across its source and drain terminals. Thus, the reference voltage $V_R$ provided by the overvoltage protection circuit 208 (relative to the second node $N_2$) is approximately the voltage $V_1$ of the first node $N_1$ multiplied by the ratio of the combined resistance of the first and second diode connected transistors 720, 722 to the total resistance of the one or more diode connected transistors 720, 722, 724. The comparative resistances provided by the diode-connected transistors 720, 722, 724 can be selected to divide the voltage between the first and second nodes $N_1$, $N_2$ by a factor selected in the range of about 1.1 to about 10. In one embodiment, the diode-connected transistors 720, 722, 724 can be configured to divide the voltage between the first and second nodes $N_1$, $N_2$ by a factor of about three halves (for example, $V_R \approx 2(V_1-V_2)/3$). It will be appreciated that any suitable impedance elements, such as, but is not limited to, resistors, can form at least a part of the voltage divider of the overvoltage protection circuit 208.

The overvoltage protection circuit 208 can be effective for regulating the voltage $V_R$ of the node $N_R$ of the discharge stage 206 and thus preventing or inhibiting the one or more MOSFET 720, 722, 724 from entering an overvoltage condition during normal operation. For example, without the overvoltage protection circuit 208, the voltage of the node $N_R$ can vary during operation based on a number of factors, such as DC bias, temperature, capacitive dynamics of the discharge stage 206, and the like effects. Accordingly, the voltage at the node $N_R$ can reach a level that could cause the discharge stage 206 to malfunction or to become damaged. For example, in a relatively high supply-voltage domain (for example, a power domain of about 5 V or greater) the voltage at the node $N_R$ could cause an overvoltage condition for the PMOS 714 or the NMOS 716. By biasing or regulating the voltage $V_R$, the overvoltage protection circuit 208 can be effective for inhibiting such an overvoltage condition from occurring.

The resistances provided by the diode-connected transistors 720, 722, 724 can be selected to inhibit or attenuate standing current leakage of the overvoltage protection circuit during normal operation. For example, in one embodiment, the one or more diode-connected transistors 720, 722, 724 can correspond to long-channel MOSFETs, each providing a resistance of about 250 kΩ or greater.

Figure 8:
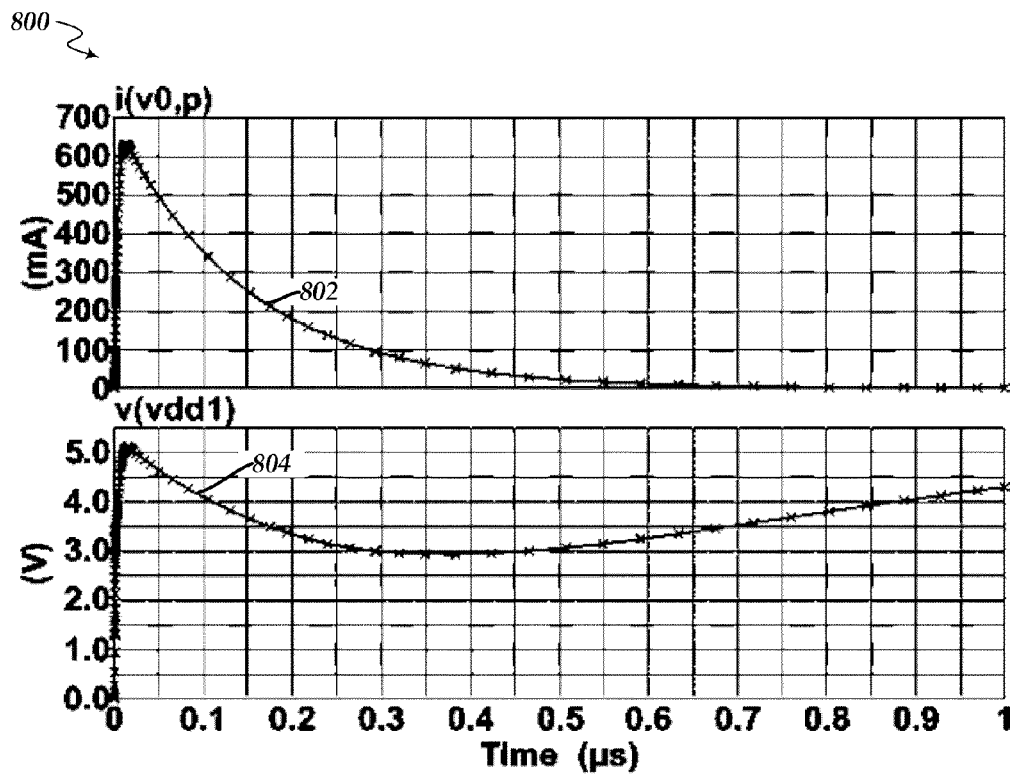
FIG. 8 is a set of graphs of a SPICE simulation of one example of a transient electrical event and an electronic protection circuit.

FIG. 8 is a set of graphs 800 of a SPICE simulation of one example of a transient electrical event and an electronic protection circuit, such as the protection circuit 108 of FIG. 2 with the overvoltage protection circuit 208. The SPICE simulation models the electronic protection circuit operating in a 5 V power domain. The driver stage can correspond to the driver stage 204a of FIG. 4. The set of graphs 800 illustrates the operation of the protection circuit during a 1 kV Human-Body-Model (HBM) electrostatic discharge (ESD) impulse over a 1 µs duration. The illustrated set of graphs 800 includes a plot 802 of clamp current versus time and a plot 804 of clamp voltage versus time. The clamp current corresponds to the current flowing from the first node $N_1$ to the second node $N_2$ of FIG. 2. The clamp voltage corresponds to the voltage between the first node $N_1$ and the second node $N_2$ of FIG. 2. The plots 802, 804 illustrate that the protection circuit 108 can effectively clamp the transient electrical event to maintain the voltage across the first node $N_1$ and the second node $N_2$ at safe voltages (for example, less than about 5 V) and safe currents (for example, less than about 650 mA) during the course of a transient electrical event.

Figure 9:
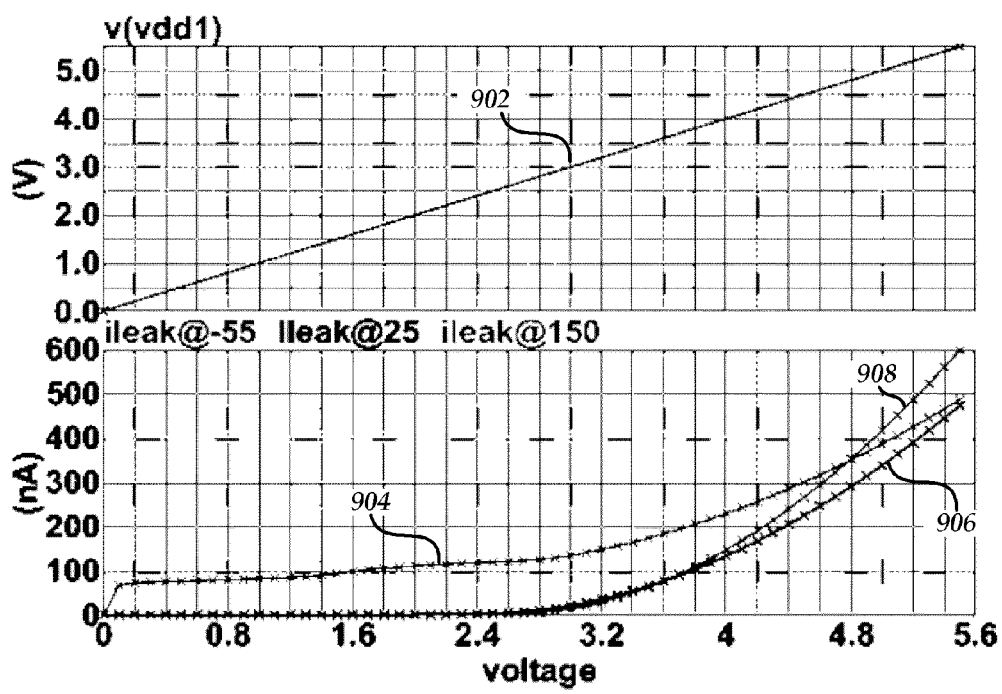
FIG. 9 is a set of graphs 900 of a SPICE simulation showing DC characteristics of one example of an electronic protection circuit.

FIG. 9 is a set of graphs 900 of a SPICE simulation showing of DC characteristics of one example of an electronic protection circuit, such as the protection circuit 108 of FIG. 2 with the overvoltage protection circuit 208. The driver stage can correspond to the driver stage 204a of FIG. 4. The set of graphs 900 illustrates the DC operation of the protection circuit 108 as the DC clamp voltage (for example, the power supply at the first node $N_1$ of FIG. 2) varies from about 0 V to about 5.5 V. The illustrated set of graphs 900 includes a plot 902 of clamp voltage versus power supply voltage and includes plots 904, 906, 908 of clamp current (for example, leakage current) versus power supply voltage at each of 150° C., 25° C., and −55° C., respectively. The plots 902, 904, 906, 908 illustrate that the protection circuit can maintain low leakage current (for example, less than about 500 mA) for a wide-range of temperatures.

Figure 10:
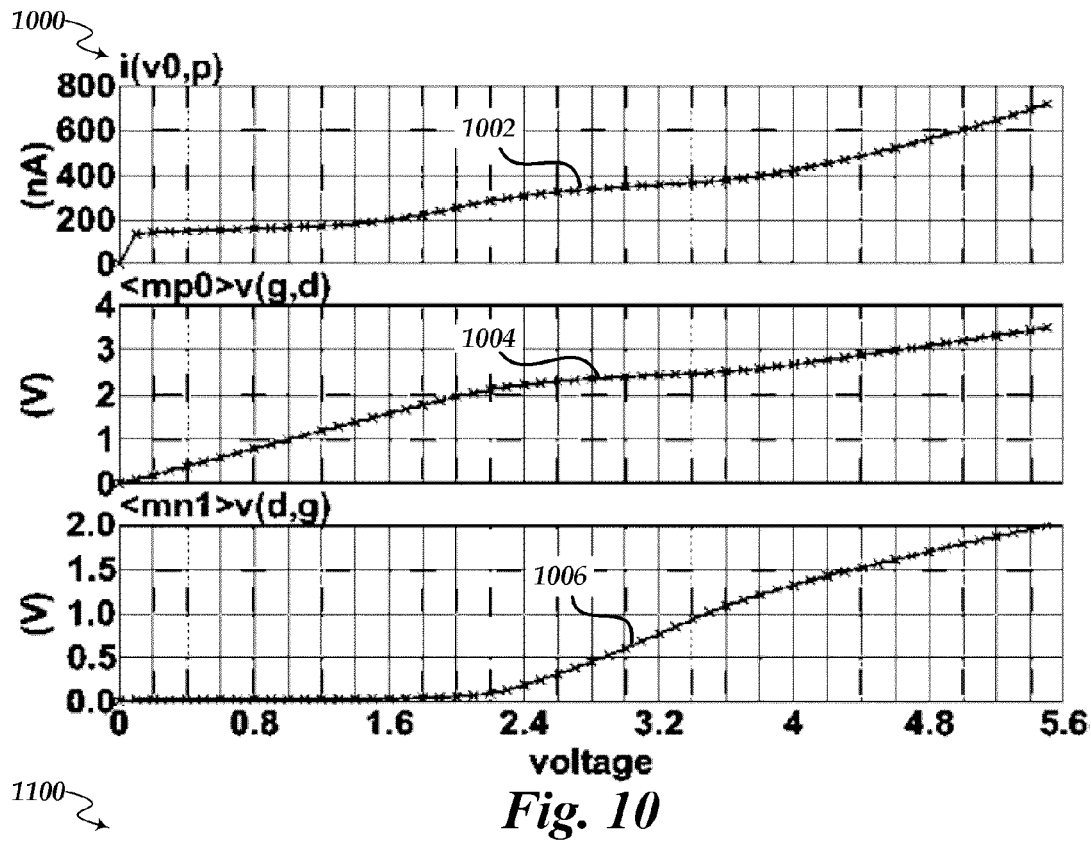
FIG. 10 is a set of graphs 1000 of a SPICE simulation showing DC characteristics of one example of an electronic protection circuit.

FIG. 10 is a set of graphs 1000 of a SPICE simulation showing the DC characteristics of one example of an electronic protection circuit, such as the protection circuit 108 of FIG. 2 with the overvoltage protection circuit 208. The driver stage can correspond to the driver stage 204a of FIG. 4. The set of graphs 1000 illustrates the DC operation of the protection circuit at one corner of the operating domain as the DC clamp voltage (for example, the power supply at the first node $N_1$ of FIG. 2) varies from 0 V to 5.5 V. The simulated corner of the operating domain, representing one of a number of "worst-case" operating conditions, includes an operating temperature of 150° C. and using a CMOS process library operating at reduced threshold voltage $V_{TH}$ levels (for example, $V_{TH} \approx 0.7$ V).

The illustrated set of graphs 1000 includes a plot 1002 of clamp current versus power supply voltage, a plot 1004 of the gate-to-drain voltage of the PMOS 714 of FIG. 7 versus power supply voltage, and a plot 1006 of the drain-to-gate voltage of the NMOS 716 of FIG. 7 versus power supply voltage. The plots 1004, 1006 illustrate that the protection circuit 108 with the overvoltage protection circuit 208 can maintain the gate-to-drain voltage of the PMOS 714 and the drain-to-gate voltage of the NMOS 716 of FIG. 7 less than about 3.5 V and out of an overvoltage condition. Various other simulations (not shown) for other corners of the operating domain also provide satisfactory results.

Figure 11:
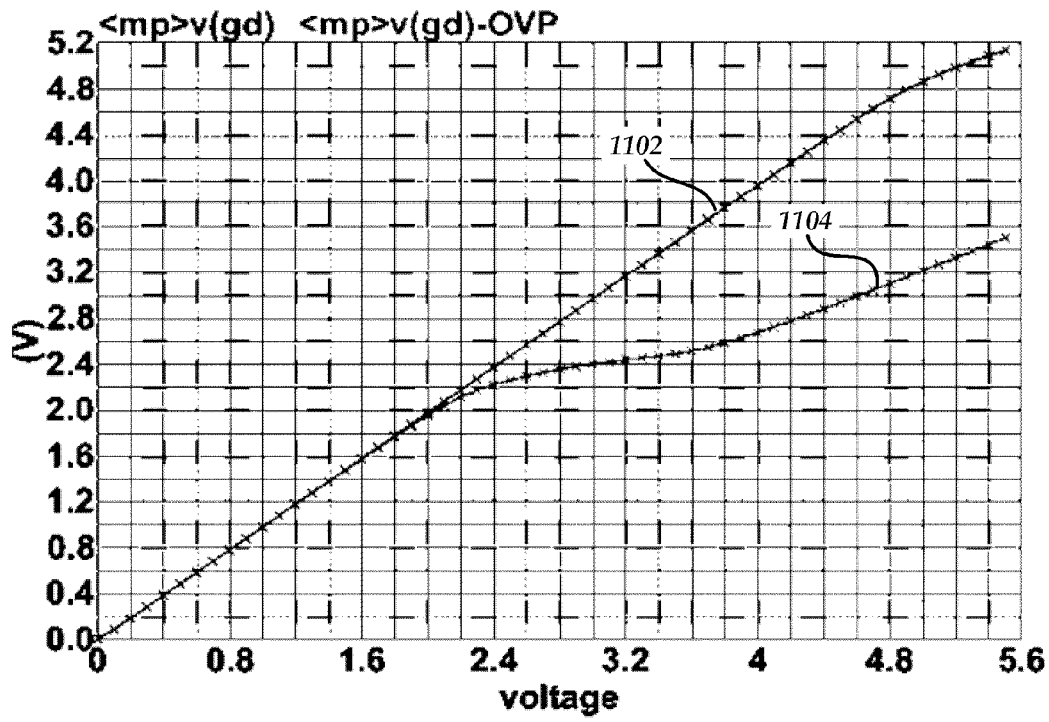
FIG. 11 is a graph 1100 of a SPICE simulation showing DC characteristics of two example electronic protection circuits.

FIG. 11 is a graph 1100 of a SPICE simulation showing the DC characteristics of two example electronic protection circuits, such as the protection circuit 108 of FIG. 2 with and without the overvoltage protection circuit 208. The driver stage can correspond to the driver stage 204a of FIG. 4. The graph 1100 illustrates the DC operation of the protection circuit 108 at a corner of operating domain of FIG. 10, as the DC clamp voltage varies from 0 V to 5.5 V. The illustrated graph 1100 includes a plot 1102 of the gate-to-drain voltage of the PMOS 714 of FIG. 7 without the overvoltage protection circuit 208 versus power supply voltage, and a plot 1104 of the gate-to-drain voltage of the PMOS 714 of FIG. 7 with the overvoltage protection circuit 208 versus power supply voltage. The plots 1102, 1104 illustrate that the overvoltage protection circuit 208 can maintain the gate-to-drain voltage of the PMOS 714 to less than about 3.5 V, whereas without the overvoltage protection circuit 208, the gate-to-drain voltage of the PMOS 714 can increase to about 5 V.

Figure 12:
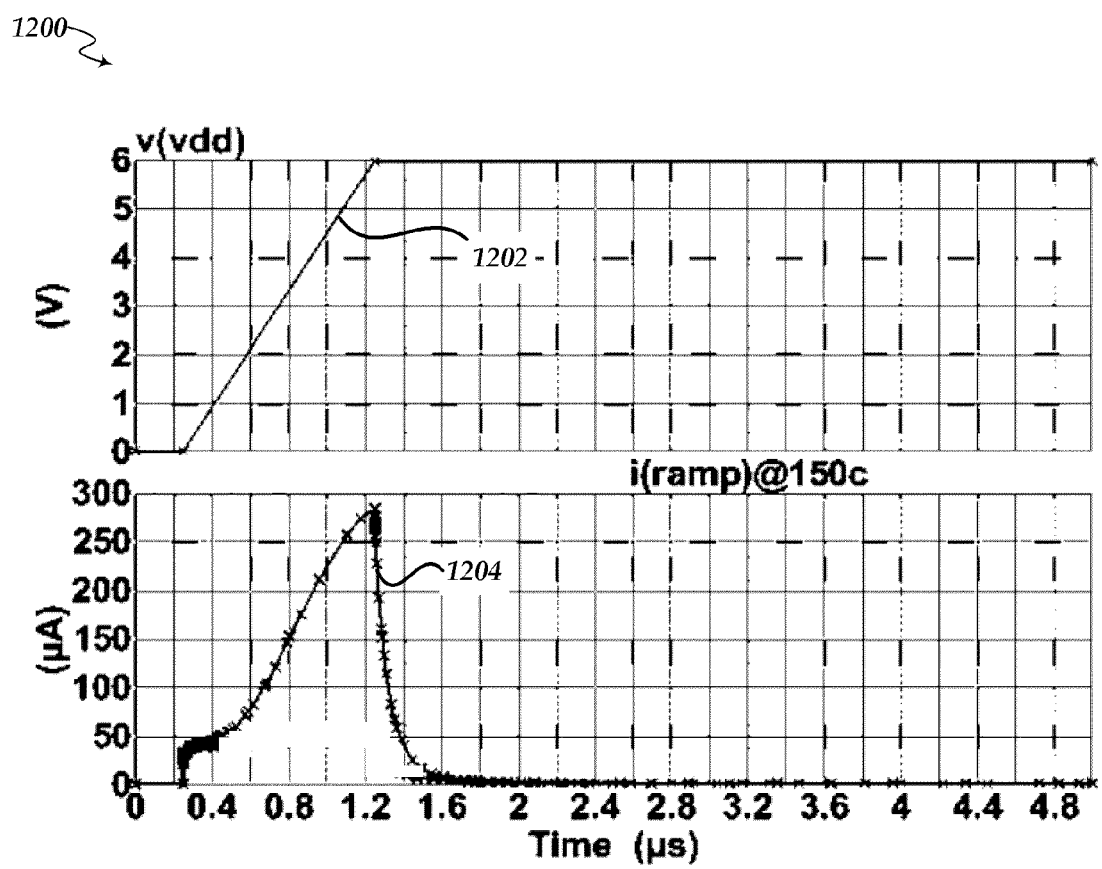
FIG. 12 is a set of graphs 1200 of a SPICE simulation of transient ramp-up characteristics of one example of an electronic protection circuit.

FIG. 12 is a set of graphs 1200 of a SPICE simulation of transient ramp-up characteristics of one example of an electronic protection circuit, such as the protection circuit 108 of FIG. 2 with the overvoltage protection circuit 208. The driver stage can correspond to the driver stage 204a of FIG. 4. The set of graphs 1200 illustrates the operation of the protection circuit as the clamp voltage (for example, the power supply at the first node $N_1$ of FIG. 2) ramps up 6 V over a duration of 1 microseconds (μs). The illustrated set of graphs 1200 includes a plot 1202 of clamp voltage versus time and a plot 1204 of clamp current versus time. The plot 1202 shows the ramp up of the clamp voltage. The ramp up can model approximately the behavior of switching on a power supply. In some embodiments, ramp up can be a normal operating condition and the protection circuit should not clamp, or at least should not remain in a clamped state. Plot 1204 illustrates that the protection circuit 108 can be effective in this situation as it initially conducts a small current (less than 300 microamperes (μA)) during ramp up and avoids false activation.

Figure 13:
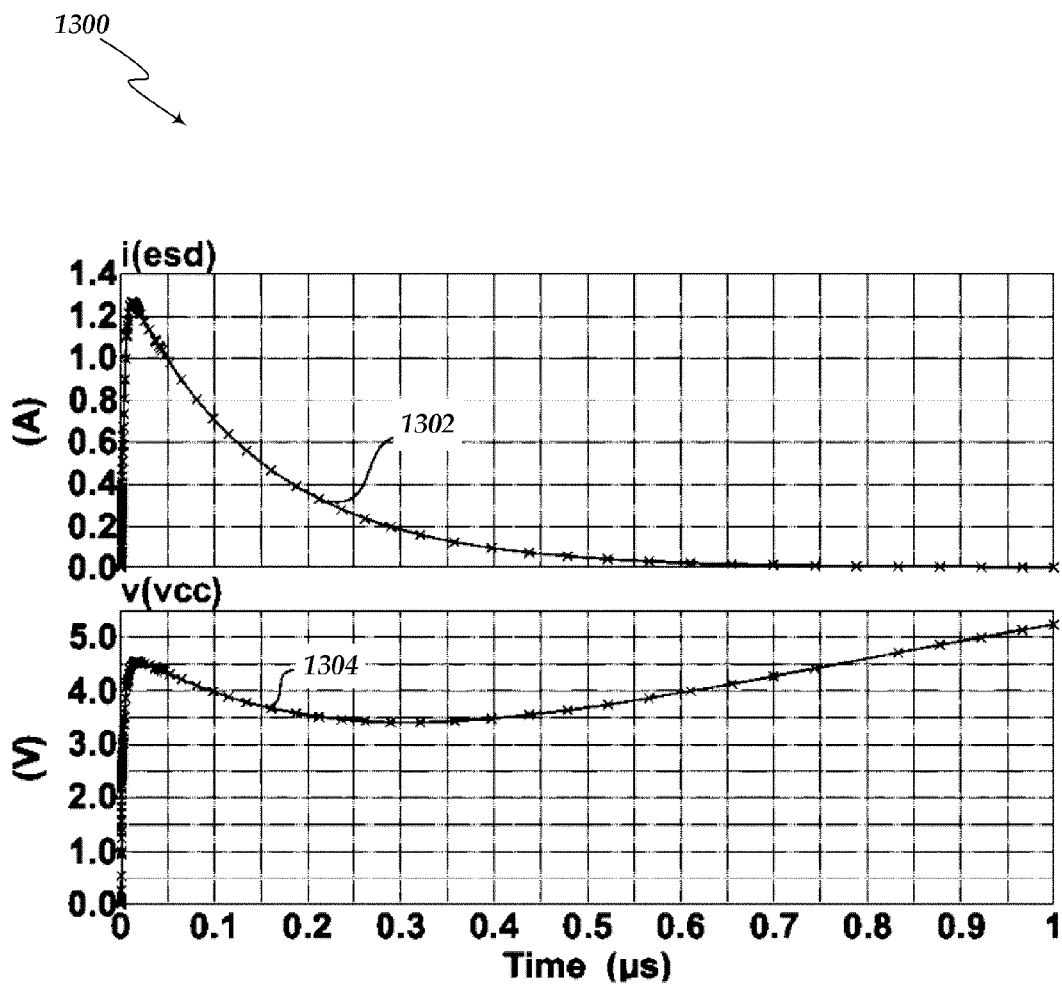
FIG. 13 is a set of graphs 1300 of a SPICE simulation of one example of a transient electrical event and an electronic protection circuit.

FIG. 13 is a set of graphs 1300 of a SPICE simulation of one example of a transient electrical event and an electronic protection circuit, such as the protection circuit 108 of FIG. 2 without the overvoltage protection circuit 208. The SPICE simulation models the electronic protection circuit operating in a 3.3 V power domain. The driver stage can correspond to the driver stage 204a of FIG. 4. The set of graphs 1300 illustrates the operation of the protection circuit 108 during a 1 kV Human-Body-Model (HBM) ESD impulse over a 1 μs duration. The illustrated set of graphs 1300 includes a plot 1302 of clamp current versus time and a plot 1304 of clamp voltage versus time. The plots 1302, 1304 illustrate that the protection circuit 108 can effectively clamp the ESD event to maintain the voltage across the first node $N_1$ and the second node $N_2$ at relatively safe voltages (for example, less than about 5 V while the ESD has substantial current) and at relatively safe currents (for example, less than about 1.3 A) during the course of a transient electrical event. Additional simulations (not shown) indicate that, during normal operation, the DC leakage current of the protection circuit can be about 50 picoamperes (pA) at 25° C. and 5.5 V bias and can be about 20 nanoamperes (nA) at 125° C. and 5.5 V bias.

Figure 14:
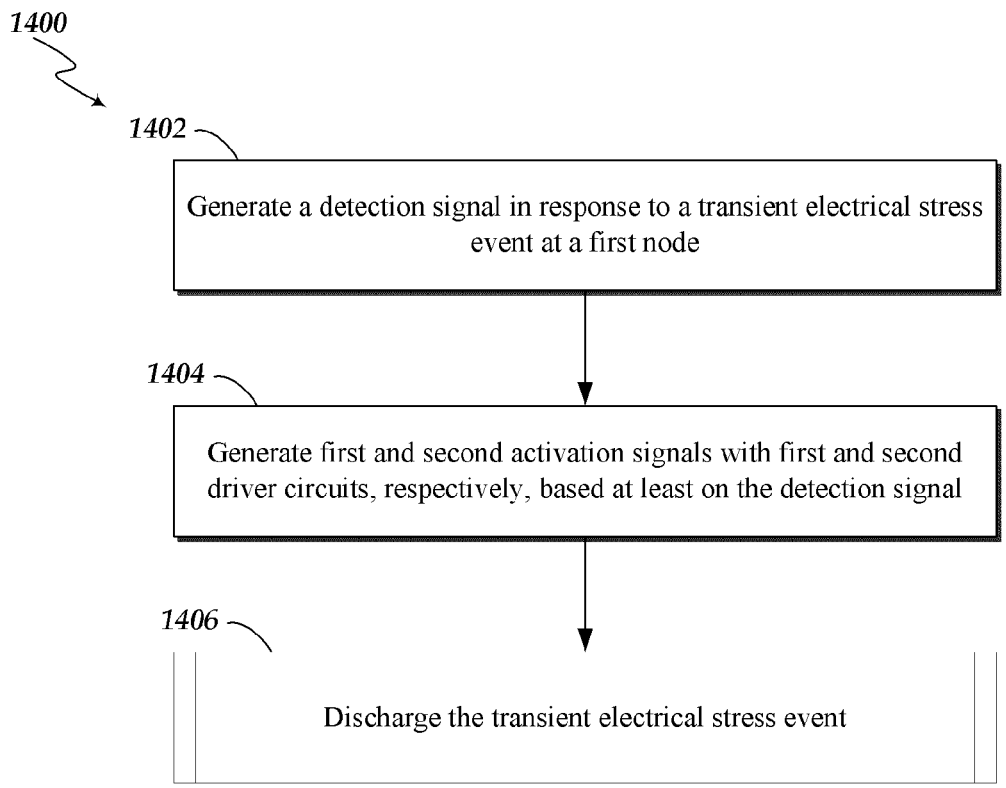
FIG. 14 is a flow chart of a method of providing transient electrical protection.

FIG. 14 is a flow chart of a method 1400 of providing transient electrical protection. The method can start at block 1402 for generating a detection signal in response to a transient electrical stress event at a first node. In one embodiment, a detection stage can monitor the voltages between a first node and a second node and generate a detection signal based on the voltages at the nodes. For example, the generation of the detection signal can correspond to the operation of the detection stage 202 of FIG. 2 and described herein. After generating the detection signal, the method 1400 can proceed to block 1404 for generating first and second activation signals with first and second driver circuits, respectively. In one embodiment, the first and second activation signals can be based at least on the detection signal generated at block 1402. Each of the first and second driver circuits can include one or more bipolar junction transistors configured to activate based at least on the detection signal. Moreover, the first and second driver circuits can generate the first activation signal and the second activation signal, respectively, at least while the one or more bipolar junction transistors of the corresponding driver circuit are activated in an ON state. The one or more bipolar junction transistors of the first and second driver circuits can conduct current substantially laterally across respective base regions. The block 1404 can correspond to the operations described in connection with the driver stage 204 of FIG. 2. Based on the first and second activation signals, the method 1400 can continue to block 1406 for discharging the transient electrical stress event. The discharging of block 1406 can be performed as described in connection with the discharge stage 206 of FIG. 7.

Figure 15:
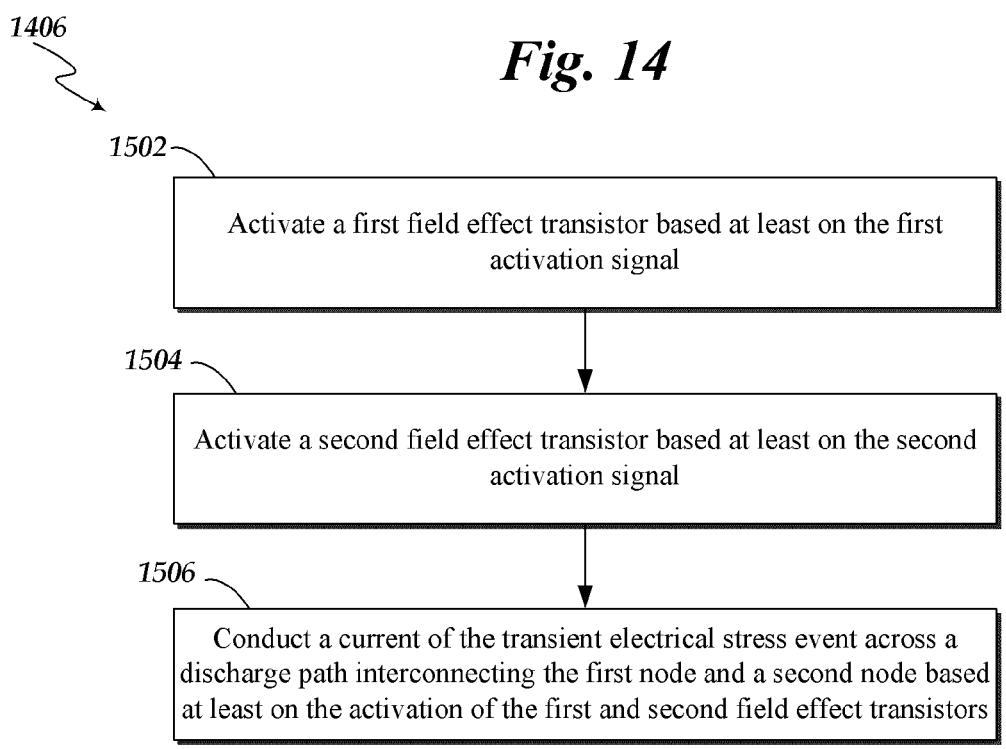
FIG. 15 is a flow chart of a sub-process of discharging the transient electrical stress event.

FIG. 15 is a flow chart of a sub-process 1406 of discharging the transient electrical stress event. The sub-process 1406 can correspond to the operation described in connection with the discharge stage 206 of FIG. 7. The illustrated sub-process 1406 can start at block 1502 for activating a first field effect transistor based at least on the first activation signal. Before, during, or after block 1502, the sub-process 146 can proceed to block 1504 for activating a second field effect transistor based at least on the second activation signal. The first and second field effect transistors can be arranged in series between a first node and a second node. After activating the first and second field effect transistors, the sub-process 1406 can continue to block 1506 for conducting a current of the transient electrical stress event across a discharge path interconnecting the first node and a second node based at least on the activation of the first and second field effect transistors.

Applications

Devices employing the above-described schemes can be implemented into various electronic devices. Examples of the electronic devices can include, but are not limited to, consumer electronic products, parts of the consumer electronic products, electronic test equipment, etc. Examples of the electronic devices can also include memory chips, memory modules, circuits of optical networks or other communication networks, and disk driver circuits. The consumer electronic products can include, but are not limited to, a mobile phone, base stations, communication modems, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

Some of the embodiments disclosed herein have been described with specific signals implemented as current-mode or voltage-mode signals, but the inventive principles also contemplate other types of signals, whether characterized as voltages or currents. Likewise, some semiconductor devices are described as being specifically NPN or PNP BJTs, or NMOS or PMOS, but in many cases different polarities or different device and/or structural types such as J-FETs and/or insulated-gate transistors (for example, MOS transistors) can also be utilized.

Moreover, the foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

What is claimed is:

1. An apparatus comprising:
a detection circuit configured to generate a detection signal based at least on a transient electrical stress event at a first node;
first and second driver circuits of an integrated circuit, the first and second driver circuits configured to receive the detection signal, each of the first and second driver circuits comprising one or more bipolar junction transistors configured to activate based at least on the detection signal, wherein the first and second driver circuits are configured to generate activation signals at least while the one or more bipolar junction transistors of the respective driver circuits are activated, the one or more bipolar junction transistors of the first and second driver circuits are configured to conduct current substantially laterally across respective base regions, wherein the first driver circuit is configured to receive at least a portion of the detection signal and is configured to generate a first activation signal, wherein the second driver is configured to receive at least a portion of the first activation signal and is configured to generate a second activation signal; and
a discharge circuit configured to receive the activation signals of the first and second driver circuits, the discharge circuit comprising:
a first field effect transistor configured to activate based at least on the activation signal of the first driver circuit; and
a second field effect transistor arranged in series with the first field effect transistor, wherein the second field effect transistor is configured to activate based at least on the activation signal of the second driver circuit,
wherein, when activated in an ON state, the first field effect transistor and the second field effect transistor are configured to conduct a current of the transient electrical stress event between the first node and a second node.

2. The apparatus of claim 1, further comprising a biasing circuit configured to provide a reference voltage at a reference node in a conductive path between the first and second field effect transistors.

3. The apparatus of claim 2, wherein the biasing circuit comprises a voltage divider circuit having a first terminal operatively coupled to the first node and a second terminal operatively coupled to the second node, wherein the voltage divider is configured to generate the reference voltage corresponding to a difference between a voltage of the first node and a voltage of the second node divided by a factor between 1.1 and 10.

4. The apparatus of claim 2, wherein the biasing circuit comprises a plurality of diode-connected transistors operatively coupled in series between the first node and the second node, wherein the biasing circuit is configured to generate the reference voltage at a node between two transistors of the plurality of diode-connected field effect transistors.

5. The apparatus of claim 1, wherein the detection circuit comprises:
a first capacitor having a first end operatively coupled to the first node and a second end operatively coupled to an output node of the detection circuit; and
a resistor having a first end operatively coupled to the output node of the detection circuit and a second end operatively coupled to the second node, wherein the detection circuit is configured to provide the detection signal at the output node of the detection signal.

6. An apparatus comprising:
a detection circuit configured to generate a detection signal based at least on a transient electrical stress event at a first node, wherein the detection circuit further comprises:
a first capacitor having a first end operatively coupled to the first node and a second end operatively coupled to an output node of the detection circuit;
a resistor having a first end operatively coupled to the output node of the detection circuit and a second end operatively coupled to the second node, wherein the detection circuit is configured to provide the detection signal at the output node of the detection signal; and
a second capacitor, disposed in a signal path between the first node and the first capacitor, the second capacitor having a first end operatively coupled to the first node and a second end operatively coupled to the first end of the first capacitor, wherein the second capacitor is configured to provide a variable capacitance characteristic;
first and second driver circuits of an integrated circuit, the first and second driver circuits configured to receive the detection signal, each of the first and second driver circuits comprising one or more bipolar junction transistors configured to activate based at least on the detection signal, wherein the first and second driver circuits are configured to generate activation signals at least while the one or more bipolar junction transistors of the respective driver circuits are activated, the one or more bipolar junction transistors of the first and second driver circuits are configured to conduct current substantially laterally across respective base regions; and
a discharge circuit configured to receive the activation signals of the first and second driver circuits, the discharge circuit comprising:
a first field effect transistor configured to activate based at least on the activation signal of the first driver circuit; and
a second field effect transistor arranged in series with the first field effect transistor, wherein the second field effect transistor is configured to activate based at least on the activation signal of the second driver circuit,
wherein, when activated in an ON state, the first field effect transistor and the second field effect transistor are configured to conduct a current of the transient electrical stress event between the first node and a second node.

7. The apparatus of claim 1, wherein the one or more bipolar junction transistors of the first driver circuit consist of bipolar junction transistors, and the one or more bipolar junction transistors of the second driver circuit consist of bipolar junction transistors.

8. The apparatus of claim 1, wherein the first driver circuit further comprises first and second resistors each having first and second ends, wherein the one or more bipolar junction transistors of the first driver circuit comprises first and second NPN bipolar junction transistors each having a base, collector and an emitter, wherein the base of the first NPN bipolar junction transistor is configured to receive the at least a portion of the detection signal, and the emitter of the second NPN bipolar junction transistor is configured to provide the at least a portion of the activation signal of the first driver circuit, wherein the collector of the first NPN bipolar junction transistor is operatively coupled to the first node, wherein the emitter of the first NPN bipolar junction transistor is operatively coupled to the first end of the first resistor, wherein the base of the second NPN bipolar junction transistor is operatively coupled to the emitter of the first NPN bipolar junction transistor and the first end of the first resistor, wherein the collector of the second NPN bipolar junction transistor is operatively coupled to the first node, wherein the emitter of the second NPN bipolar junction transistor is operatively coupled to the first end of the second resistor, wherein the second end of the first resistor is operatively coupled to the second node, and wherein the second end of the second resistor is operatively coupled to the second node.

9. The apparatus of claim 1, wherein the first driver circuit is configured to receive the at least a portion of the detection signal via a first signal path and the second driver circuit is configured to receive the at least a portion of the detection signal via a second signal path different from the first signal path.

10. The apparatus of claim 1, wherein at least one driver circuit of the first driver circuit or the second driver circuit further comprises a reference voltage circuit, wherein the reference voltage circuit is configured to set the activation signal of the corresponding driver circuit to a predetermined voltage when the corresponding driver circuit is activated.

11. The apparatus of claim 10, wherein the reference voltage circuit comprises one or more blocking diode-connected transistors configured to set the activation signal when the one or more blocking diode-connected transistors are activated.

12. An apparatus comprising:
a detection circuit configured to generate a detection signal based at least on a transient electrical stress event at a first node;
first and second driver circuits of an integrated circuit, the first and second driver circuits configured to receive the detection signal, each of the first and second driver circuits comprising one or more bipolar junction transistors configured to activate based at least on the detection signal wherein the first and second driver circuits are configured to generate activation signals at least while the one or more bipolar junction transistors of the respective driver circuits are activated, the one or more bipolar junction transistors of the first and second driver circuits are configured to conduct current substantially laterally across respective base regions; and
a discharge circuit configured to receive the activation signals of the first and second driver circuits, the discharge circuit comprising:
a first field effect transistor configured to activate based at least on the activation signal of the first driver circuit; and
a second field effect transistor arranged in series with the first field effect transistor, wherein the second field effect transistor is configured to activate based at least on the activation signal of the second driver circuit, wherein, when activated in an ON state, the first field effect transistor and the second field effect transistor are configured to conduct a current of the transient electrical stress event between the first node and a second node, and wherein:
the first field effect transistor corresponds to an N channel transistor type that includes a gate configured to receive the activation signal of the first driver circuit and a source operatively coupled to the second node; and
the second field effect transistor corresponds to a P channel transistor type that includes a gate configured to receive the activation signal of the second driver circuit, a drain operatively coupled to the drain of the first field effect transistor, and a source operatively coupled to the first node.

13. The apparatus of claim 1, wherein the one or more bipolar junction transistors of the first driver circuit, the one or more bipolar junction transistors of the second driver circuit, and the first and second field effect transistors of the discharge circuit correspond to at least a portion of a sub-65 nanometer complementary metal-oxide-semiconductor process integrated circuit.

14. An electronically implemented method of providing transient electrical protection, the method comprising:
generating a detection signal in response to a transient electrical stress event at a first node;
generating first and second activation signals with first and second driver circuits, respectively, based at least on the detection signal, each of the first and second driver circuits of an integrated circuit comprising one or more bipolar junction transistors configured to activate based at least on the detection signal, wherein the first and second driver circuits are configured to generate the first activation signal and the second activation signal, respectively, at least while the one or more bipolar junction transistors of the corresponding driver circuit are activated in an ON state, wherein the one or more bipolar junction transistors of the first and second driver circuits are configured to conduct current substantially laterally across respective base regions, wherein the first driver circuit is configured to receive at least a portion of the detection signal and is configured to generate the first activation signal, wherein the second driver is configured to receive at least a portion of the first activation signal and is configured to generate the second activation signal based at least partly on the portion of the first activation signal, and
discharging the transient electrical stress event, wherein discharging comprises:
activating a first field effect transistor based at least on the first activation signal;
activating a second field effect transistor based at least on the second activation signal, wherein the first and second field effect transistors are arranged in series; and
conducting a current of the transient electrical stress event across a discharge path interconnecting the first node and a second node based at least on the activation of the first and second field effect transistors.

15. The method of claim 14, further comprising biasing a reference node between the first and second field effect transistors to a reference voltage.

16. The method of claim 14, wherein the one or more bipolar junction transistors of the first driver circuit consist of one or more bipolar junction transistors, and the one or more bipolar junction transistors of the second driver circuit consist of one or more bipolar junction transistors.

17. An electronically implemented method of providing transient electrical protection, the method comprising:
generating a detection signal in response to a transient electrical stress event at a first node;
generating first and second activation signals with first and second driver circuits, respectively, based at least on the detection signal, each of the first and second driver circuits of an integrated circuit comprising one or more bipolar junction transistors configured to activate based at least on the detection signal, wherein the first and second driver circuits are configured to generate the first activation signal and the second activation signal, respectively, at least while the one or more bipolar junction transistors of the corresponding driver circuit are activated in an ON state, wherein the one or more bipolar junction transistors of the first and second driver circuits are configured to conduct current substantially laterally across respective base regions; and discharging the transient electrical stress event, wherein discharging comprises:
  activating a first field effect transistor based at least on the first activation final;
  activating a second field effect transistor based at least on the second activation signal, wherein the first and second field effect transistors are arranged in series; and
  conducting a current of the transient electrical stress event across a discharge path interconnecting the first node and a second node based at least on the activation of the first and second field effect transistors, wherein:
    the first field effect transistor corresponds to an N-channel transistor type that includes a gate configured to receive the activation signal of the first driver circuit and a source operatively coupled to the second node; and
    the second field effect transistor corresponds to a P-channel transistor type that includes a gate configured to receive the activation signal of the second driver circuit, a drain operatively coupled to the drain of the first field effect transistor, and a source operatively coupled to the first node.

18. An apparatus of providing transient electrical protection, the apparatus comprising:
  a means for generating a detection signal in response to a transient electrical stress event at a first node; and
  an integrated circuit comprising:
    a means for generating a first activation signal based at least on the detection signal, the first activation signal generating means comprising one or more bipolar junction transistors configured to activate based at least on the detection signal, wherein the first activation signal generating means is configured to generate the first activation signal at least while the one or more bipolar junction transistors of the first activation signal generating means are activated in an ON state, wherein the one or more bipolar junction transistors of the first activation signal generating means are configured to conduct current substantially laterally across respective base regions;
    a means for generating a second activation signal based at least on the detection signal, the second activation signal generating means comprising one or more bipolar junction transistors configured to activate based at least on the detection signal, wherein the second activation signal generating means is configured to generate the second activation signal at least while the one or more bipolar junction transistors of the second activation signal generating means are activated, wherein the one or more bipolar junction transistors of the second activation signal generating means are configured to conduct current substantially laterally across respective base regions; and
    a means for discharging the transient electrical stress event, for activating a first field effect transistor based at least on the first activation signal, for activating a second field effect transistor arranged in series with the first field effect transistor based at least on the second activation signal, and for carrying a current of the transient electrical stress event across a discharge path, interconnecting the first node and a second node, based at least on the activation of the first and second field effect transistors, wherein the first field effect transistor includes an n-channel field effect transistor, wherein the second field effect channel includes a p-channel field effect transistor.

* * * * *